(12) United States Patent
Abedin et al.

(10) Patent No.: US 9,325,152 B2
(45) Date of Patent: Apr. 26, 2016

(54) RAMAN DISTRIBUTED FEEDBACK FIBER LASER AND HIGH POWER LASER SYSTEM USING THE SAME

(75) Inventors: Kazi S. Abedin, Basking Ridge, NJ (US); Tristan Kremp, Somerset, NJ (US); Jeffrey W. Nicholson, Morris Town, NJ (US); Jerome C. Porque, Readington, NJ (US); Paul S. Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/113,524

(22) PCT Filed: Apr. 25, 2012

(86) PCT No.: PCT/US2012/035065
§ 371 (c)(1),
(2), (4) Date: Jan. 14, 2014

(87) PCT Pub. No.: WO2012/149068
PCT Pub. Date: Nov. 1, 2012

(65) Prior Publication Data
US 2014/0112357 A1    Apr. 24, 2014

Related U.S. Application Data

(60) Provisional application No. 61/478,677, filed on Apr. 25, 2011.

(51) Int. Cl.
*H01S 3/30* (2006.01)
*H01S 3/067* (2006.01)
*H01S 3/07* (2006.01)
*H01S 3/08* (2006.01)
*H01S 3/082* (2006.01)
(Continued)

(52) U.S. Cl.
CPC .............. *H01S 3/302* (2013.01); *H01S 3/0675* (2013.01); *H01S 3/0014* (2013.01); *H01S 3/06712* (2013.01); *H01S 3/07* (2013.01);
(Continued)

(58) Field of Classification Search
CPC .............. H01S 3/094003; H01S 3/094042; H01S 3/094046; H01S 3/302; H01S 3/0675; H01S 3/0014; H01S 3/06712; H01S 3/07; H01S 3/08022; H01S 3/0826; H01S 3/1086
USPC ...................................... 272/3, 102
See application file for complete search history.

(56) References Cited

U.S. PATENT DOCUMENTS 4,717,842 A * 1/1988 Komine ................. 359/327
6,304,585 B1 * 10/2001 Sanders et al. ............ 372/22
(Continued)

OTHER PUBLICATIONS

Youfang Hu, "Improved design of a DFB Raman fibre laser", May 2009, Optics Communications 282 (2009) 3356-3359.*

*Primary Examiner* — Xinning Niu
*Assistant Examiner* — Vu A Vu
(74) *Attorney, Agent, or Firm* — Sam S. Han, Esq.

(57) ABSTRACT

A Raman distributed feedback (DFB) fiber laser is disclosed. It includes a pump source and a Raman gain fiber of a length smaller than 20 cm containing a distributed feedback (DFB) grating with a discrete phase structure located within no more than 10% off the center of the grating and wherein the Raman DFB fiber laser generates a laser signal with an optical spectrum, which has an optical bandwidth at half maximum optical intensity of less than 1 gigahertz (GHz) (wherein a maximum intensity frequency is different from the frequency of the pump laser). The Raman laser includes compensation for the nonlinear phase change due to Kerr effect and thermal effect resulting from absorption of the optical field, thus enhancing the conversion efficiency.

22 Claims, 14 Drawing Sheets

(51) Int. Cl.
　　　*H01S 3/094*　　　(2006.01)
　　　*H01S 3/108*　　　(2006.01)
　　　*H01S 3/00*　　　　(2006.01)
(52) U.S. Cl.
　　　CPC .......... *H01S 3/08022* (2013.01); *H01S 3/0826* (2013.01); *H01S 3/094003* (2013.01); *H01S 3/094042* (2013.01); *H01S 3/094046* (2013.01); *H01S 3/1086* (2013.01)

(56) References Cited

U.S. PATENT DOCUMENTS

| | | | |
|---|---|---|---|
| 6,411,323 B1 * | 6/2002 | Waarts et al. | 347/241 |
| 6,690,507 B2 * | 2/2004 | Gray et al. | 359/341.32 |
| 6,915,040 B2 * | 7/2005 | Willner et al. | 385/37 |
| 7,656,526 B1 * | 2/2010 | Spuler et al. | 356/336 |
| 2009/0296743 A1 * | 12/2009 | Islam | 372/3 |

* cited by examiner

RAMAN DISTRIBUTED FEEDBACK FIBER LASER AND HIGH POWER LASER SYSTEM USING THE SAME

CROSS REFERENCE

This application claims the benefit of U.S. Provisional Application No. 61/478,677 filed Apr. 25, 2011, which is incorporated herein by reference. The following references are incorporated herein by reference: (1) V. E. Perlin and H. G. Winful, "Distributed Feedback Fiber Raman Laser", IEEE Journal of Quantum Electronics 37 38, (2001); (2) Y. Hu and N. G. R. Broderick, "Improved design of a DFB Raman fibre laser" Opt. Comm. 282 3356 (2009); (3) J. Shi and M. Ibsen "Effects of phase and amplitude noise on π phase-shifted DFB Raman fibre lasers" Bragg Gratings Poling and Photosensitivity, JThA30 (2010); and (4) Agrawal, Nonlinear Fiber Optics, $3^{rd}$ ed., Academic Press 2001, Eq. (2.3.34), p. 47.

BACKGROUND

There is significant demand for high power narrow linewidth laser sources, with wavelength that extends beyond the gain bandwidth of existing rare earth ions (REIs), such as, for example, ytterbium (1 micron), erbium (1.55 micron), and thulium (~2 micron)

While Raman scattering in optical fiber is useful to obtain gain at any wavelength within the transparency window of the fiber with a suitable choice of the pump wavelength, and all-fiber Raman laser resonators have been demonstrated using Bragg reflectors, as well as other types of resonant cavities, as illustrated in FIG. 1 and of which a transmission spectrum is illustrated in FIG. 2, it has not yet been possible to achieve oscillation with linewidth narrower than ~1 GHz. Although Raman distributed feedback (DFB) lasers have been proposed theoretically to produce single frequency generation, this has not been demonstrated to date due to severe design deficiencies and practical limitations, as described below.

In practice, a number of problems have made it difficult to achieve single frequency or narrow linewidth Raman lasing in DFB laser structures. These include:
(1) loss due to the UV exposure during grating writing,
(2) difficulty in fabricating long gratings with high uniformity,
(3) Kerr-nonlinearity induced Bragg-wavelength variation,
(4) variations due to non-uniform thermal distribution along the grating and within the fiber, causing refractive index changes, for example, and
(5) high required pump powers.

In general, use of fiber Raman gain to generate narrowband signals at wavelengths away from REI gain bandwidths has not been achieved with high power using available pumps in conventional laser cavities designed using fiber Bragg gratings.

Even with attention to critical details, the demonstrated practical performance has resulted in (1) a large power threshold for lasing, (2), a small output power, and (3) inefficient conversion of pump power into a single frequency or suitably narrow linewidth signal.

Note, that although much of this document discusses fiber waveguides, the inventive concepts are applicable to other types of waveguides, such as planar waveguides and others, as well. Furthermore, it's possible that lasing can be achieved even without waveguides formed using mechanisms such as gain guiding or thermal lensing given the high optical intensities.

SUMMARY

One aspect of the present invention provides a Raman laser having an optical input enabled to receive radiation from a pump laser, and a Raman gain fiber less than 20 cm long, wherein the Raman gain fiber includes at least one Bragg grating enabled to provide laser radiation arising from Raman scattering, also known as Raman radiation, on an optical output.

In accordance with further aspects of the present invention, the at least one Bragg grating has a phase shift. Additionally, the grating can have a longitudinally nonuniform profile in refractive index modulation strength. Further, the grating can have a longitudinally nonuniform profile in phase.

In accordance with another aspect of the present invention, the Raman laser generates Raman radiation on the optical output with an optical spectrum having an optical bandwidth at half maximum optical intensity of about or less than 1 gigahertz (GHz). In accordance with a further aspect of the present invention, the optical bandwidth is about or less than 100 MHz. In accordance with a further aspect of the present invention, the optical bandwidth is about or less than 10 MHz.

In accordance with an aspect of the present invention, a threshold power of the Raman laser is in a range of 0.08-10 W. Another aspect of the present invention, a threshold power of the Raman laser is in a range of 1-5 W. According to a further aspect of the invention, a threshold power of the Raman laser is in a range of 1.28-4.4 W.

In accordance with a further aspect of the present invention, the Raman radiation output from the Raman laser is amplified by one or more external Raman gain fibers by utilizing unabsorbed pump radiation.

Additionally, the Raman laser, in another embodiment of the present invention, can be placed within a laser resonator and pumped by a resonant field of the laser resonator. The pump-induced gain for the signal in the laser resonator can be either Raman-based or rare-earth based.

In accordance with another embodiment of the present invention, at least one additional Raman laser is provided. Each additional Raman laser is placed in cascade (or in series) with the Raman laser. The pump laser is common to the Raman lasers placed in cascade.

In accordance with another aspect of the present invention, the Bragg grating in the Raman laser is chirped with respect to a Bragg wavelength to cause a Bragg wavelength excursion along at least a part of a length of the Bragg grating wherein the intensity of the optical field and an associated index change due to Kerr effect, or absorption-induced heating, is large in relation to a different part of the Bragg grating. Furthermore, a location of a largest negative Bragg wavelength excursion coincides with a location of the phase-shift of the Bragg grating. If the pump intensity has a significant longitudinal gradient (e.g., strong pump, strong depletion of the pump or strong linear absorption), the pump-induced thermal effect can be significant and has to be covered by this "optical field." As used herein, "excursion" is defined as a deviation from a nominal value.

In accordance with a further aspect of the present invention, the Raman laser is provided with a temperature control element to control a temperature excursion along at least a part of a length of the Bragg grating wherein the intensity of the optical field and an associated index change due to Kerr effect or absorption-induced heating is large in relation to a different part of the Bragg grating. Further, a location of a largest temperature excursion coincides with a location of the phase-shift of the Bragg grating.

In accordance with yet another aspect of the present invention, the Raman laser is provided with a strain control element to control a strain excursion along at least a part of a length of the Bragg grating wherein the intensity of the optical field and an associated index change due to Kerr effect or absorption-induced heating is large in relation to a different part of the Bragg grating, and with a location of a largest strain excursion coincident with a location of the phase-shift of the Bragg grating.

Each of these previously described aspects and embodiments of the present invention were provided with the Raman laser having a Raman gain fiber less than 20 cm in length.

Many aspects of the present invention are applicable to Raman lasers regardless of the length of the gain fiber, as described in the following paragraphs.

In one embodiment of the present invention, a fiber Raman laser cavity includes: a pump laser, a fiber Bragg grating having a phase shift, wherein the Bragg grating is chirped with respect to a Bragg wavelength to cause a Bragg wavelength excursion along at least a part of a length of the grating, wherein the optical field and the index change due to Kerr effect or absorption-induced heating is large in relation to a different part of the grating, and, further, a location of a largest negative Bragg wavelength excursion coincides with a location of the phase shift; and an output of the fiber Raman laser cavity to provide Raman radiation.

In this embodiment of the present invention, the phase shift can be about $\pi$ radians. Additionally, the Bragg wavelength excursion can be approximately proportional to the intensity of the optical field in the cavity.

In accordance with another embodiment of the present invention, a fiber Raman laser cavity includes: a pump laser; a temperature control element to control a temperature excursion along at least a part of a length of the Bragg grating, wherein the optical field and the index change due to Kerr effect or absorption-induced heating is large in relation to a different part of the Bragg grating, and further, a location of a largest temperature excursion coincident with a location of the phase-shift; and an output of the fiber Raman laser cavity to provide Raman radiation.

In this embodiment, the temperature control element can be a temperature control device such as a heating device or a cooling device. The phase shift is about $\pi$ radians.

In accordance with another embodiment of the present invention, a Raman laser includes: an optical input enabled to receive radiation from a pump laser; a first Raman gain fiber connected to the optical input that includes at least one Bragg grating enabled to provide Raman radiation on a first optical output; and a second Raman gain fiber connected in series with the first Raman gain fiber to the first optical output, the second Raman gain fiber comprising at least one Bragg grating enabled to provide Raman radiation on a second optical output. The second Raman gain fiber is amplified by unabsorbed output from the pump laser. Alternately, the second Raman gain fiber may be pumped by a second pump source introduced after the first Raman gain fiber. Further, one or more additional Raman gain fibers can be connected in series to the second optical output, each of the additional Raman gain fibers comprising at least one Bragg grating enabled to provide Raman radiation.

In accordance with another embodiment of the present invention, a laser includes a laser pump, a laser resonator connected to the laser pump, wherein the laser resonator is pumped by the laser pump, and a Raman gain fiber comprising at least one Bragg grating, which is located within the laser resonator.

DETAILED DESCRIPTION

Figure 1:
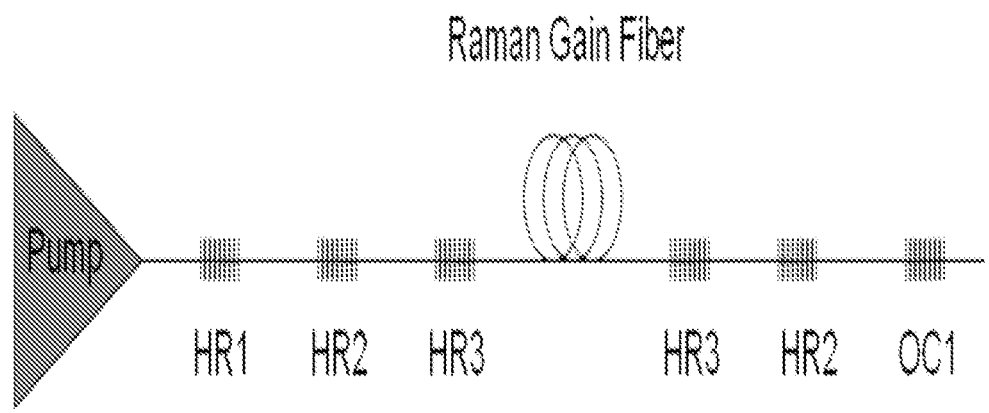
FIG. 1 illustrates a diagram of wavelength conversion devices based on cascaded Raman resonators, according to the prior art.

Single frequency and narrow linewidth tunable lasers have potential to be used in a wide variety of applications, such as remote sensing, laser radar (LIDAR), spectroscopy, optical coherence tomography, and so on.

There are many ways from which one can obtain laser radiation, which includes external cavity lasers, semiconductors, and fiber distributed feedback (DFB) lasers. DFB lasers can be created with fiber Bragg gratings inscribed in a core of an active fiber waveguide, and are capable of producing narrow band laser radiation when pumped at a suitable wavelength. Compared with semiconductor DFB lasers, fiber DFB lasers are attractive because of their superior optical properties including low noise and narrower linewidth. Also, the in-fiber design of such fiber DFB lasers allows for efficient coupling to fiber amplifiers and other fiber components. The reference to "pump" or "pumping" refers to the provision of an energy source which is converted to a laser signal (output) energy typically by some nonlinear effect such as Raman scattering in a DFB cavity. The sum of the pump and signal fields is referred to as the optical field herein.

In a fiber grating, the mode effective index $n_{grating}(z)$ is quasi-periodically modulated according to.

$$n_{grating}(z)=n+\Delta n_{dc}(z)+\Delta n_{ac}(z)\cos(2\pi z/\Lambda+\phi(z)),$$

with the longitudinal coordinate z along the length of the fiber, the average (effective) index n, the dc-index change $\Delta n_{dc}(z)$, the modulation amplitude $\Delta n_{ac}(z)$ ("grating strength") of the index change, phase of the grating $\phi(z)$, and the grating period $\Lambda$. Such a grating can be used to couple different modes of the fiber, i.e., transfer energy between different modes. If different copropagating modes (travelling in the same direction) should be coupled, the required spatial frequency $1/\Lambda$ of the grating is relatively small because the difference between spatial frequencies of co-propagating modes is small. Due to this large $\Lambda$, typically ranging from tens to hundreds of micrometers, such a grating is also called a long period grating.

In contrast, if counterpropagating modes of wavelength $\lambda$ should be coupled, the spatial frequency $1/\Lambda$ of the grating has to be equal to the large difference $n/\lambda-(-n/\lambda)=2n/\lambda$ of the spatial frequencies of the counter-propagating modes. Since the grating period $\Lambda=\lambda/(2n)$ is of the order of only hundreds of nanometers (typically $\Lambda\approx535$ nm for $\lambda=1550$ nm in silica fiber with $n\approx1.45$), such gratings are called short period or Bragg gratings, and said condition $\lambda=2n\Lambda$ is the Bragg condition.

While n(z) varies on a scale of the grating period $\Lambda$, the quantities $\Delta n_{ac}(z)$, $\Delta n_{dc}(z)$ and $\phi(z)$ are either constant or vary only over a much longer scale (typically tens of microns to centimeters) and are therefore referred to as slowly varying quantities.

Figure 19:
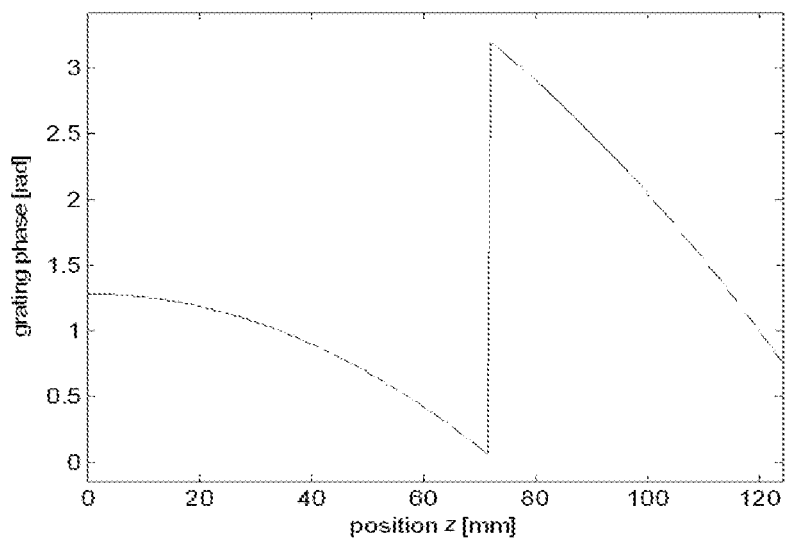
FIG. 19 shows the phase of a Bragg grating that has been optimized for a maximum output power under the constraints of 70 Watt input power, a discontinuous pi-shift at 58% length, linear losses of 1 dB/m, negligible nonlinear loss and infinite thermal conductivity, in accordance with an aspect of the present invention.

If the first derivative of the grating phase satisfies $d\phi/dz=a$, with some constant a (i.e., a vanishing second derivative $d^2\phi/dz^2\equiv0$), the Bragg wavelength is $\lambda=2n\Lambda/[1+a\Lambda/(2\pi)]$. Hence, a constant positive $d\phi/dz=a>0$ shifts the spectrum to a shorter wavelength. Otherwise, i.e., in the case of a nonzero second derivative $d^2\phi/dz^2\neq0$, the grating is called chirped. An example of a chirped grating is shown in FIG. 19.

Figure 18:
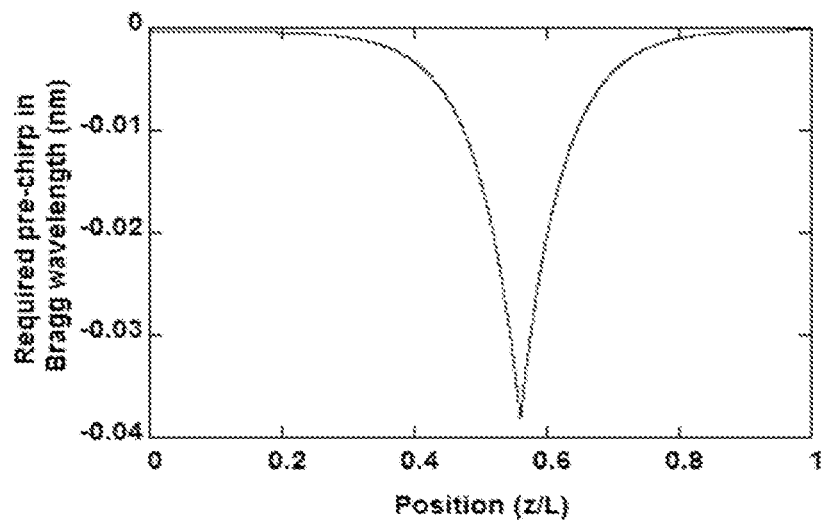
FIG. 18 illustrates a Raman DFB laser with a pre-chirp in the Bragg grating wavelength, in accordance with an aspect of the present invention.
Figure 23:
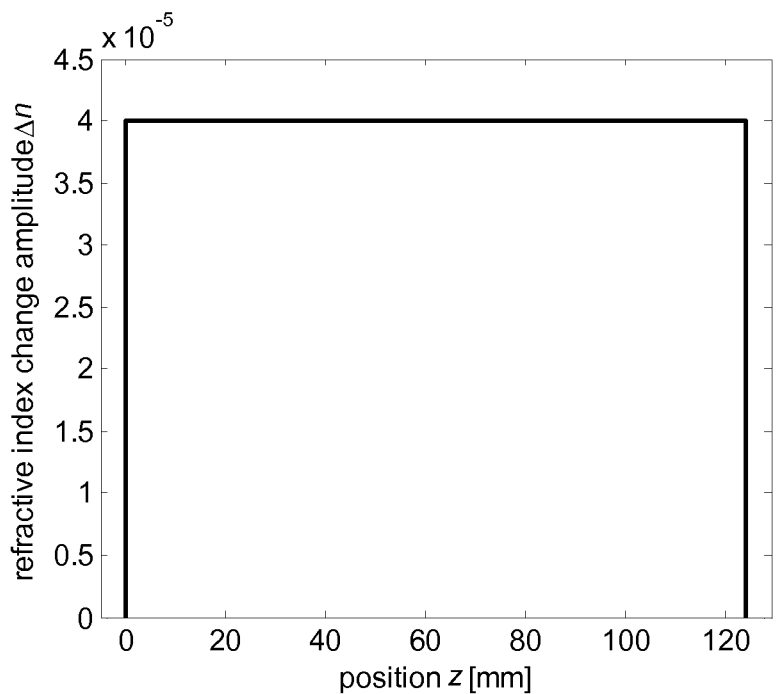
FIG. 23 illustrates the refractive index change amplitude of a uniform Bragg grating.
Figure 24:
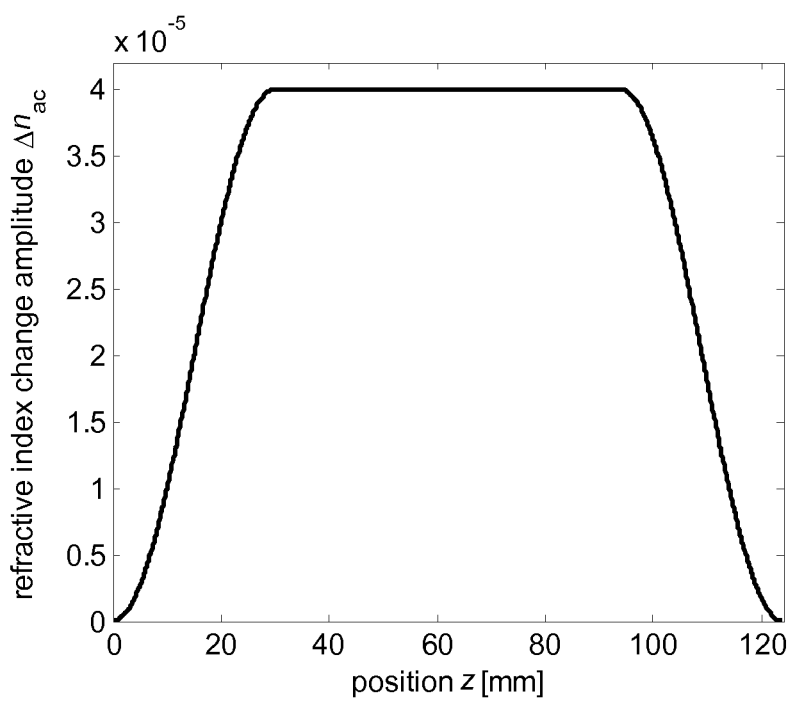
FIG. 24 illustrates the refractive index change amplitude of an apodized grating.
Figure 25:
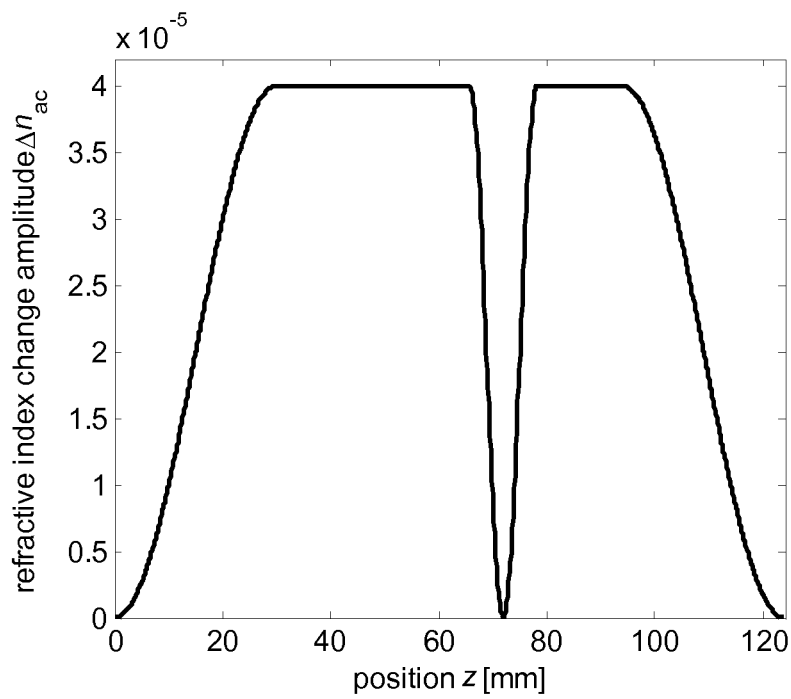
FIG. 25 illustrates the refractive index change amplitude of a grating that is apodized at the phase shift.

In a so-called $\pi$-shifted DFB grating, the phase $\phi(z)$ changes its value by an amount of $\pi$ radians over a short distance of typically less than a few millimeters. Mathematically, this is often modeled by a discontinuous jump of $\phi(z)$ at some position $z=z_0$. However, a physical grating has a continuous refractive index, i.e., $\cos(\phi(z))$ is always a continuous function in reality. In general, the phase $\phi(z)$ can be any suitable function that gives a grating with useful properties (e.g., high Q of the laser cavity), see, e.g., FIGS. 18 and 19. It is noted that FIGS. 18 and 19 illustrate different embodiments of the present invention. Similarly, the modulation amplitude $\Delta n_{ac}(z)$ is not restricted to the most common shapes (constant or apodized, e.g., Gaussian or raised-cosine, see, for example, FIGS. 23 and 24), but can also be any suitable function. In particular, $\Delta n_{ac}(z)$ may be constantly (or approximately) zero over a certain part of the grating and nonzero at other parts of the grating, as illustrated in FIG. 25. Hence, our notion of a "DFB grating" also covers the case of two or more spatially separated gratings, which may also be interpreted as a DBR (distributed Bragg reflector) grating structure. A nonuniform dc-index $\Delta n_{dc}(z)$ typically results from the grating inscription and is not necessary for the functionality of a DFB cavity.

"Phase-shifted grating" or "grating with a phase shift" or "phase shift" as used herein is intended to mean a grating that has such a suitable phase $\phi(z)$.

"$\pi$-shifted grating," "grating with a $\pi$-shift," or the like as used herein means the phase $\omega(z)$ changes in value by of $\pi$ radians along the longitudinal coordinate z in a relevant part of the grating. This change can be continuous or discontinuous. Since the phase comes as an argument of a trigonometric function, and trigonometric functions are periodic with a period of $2\pi$ radians, a phase shift of $\pi$ is equivalent to a phase shift of $(2n+1)\pi$, where n is any integer number (positive, negative or zero). Therefore, without loss of generality, we choose n=0, i.e., a $\pi$-shift, for notational simplicity.

It is noted that a required phase-shift of $\pi$ radians or a $\pi$-shift may also be a phase shift that is close to $\pi$, that is, within 0.1% of π. Such a tolerance also includes the phase shift being close enough to π such that the resulting optical cavity has a Q factor high enough to allow for lasing.

A nonconstant dc-index $\Delta n_{dc}(z)$ typically results from the grating inscription and is not necessary for the functioning of a DFB cavity. Nevertheless, $\Delta n_{dc}(z)$ has the same effect on the mode coupling as a grating phase $\omega(z)$ that satisfies $$\frac{d\varphi}{dz} = \frac{2\pi}{n\Lambda}\Delta n_{dc}(z),$$

because the complex-valued mode coupling coefficient, which couples the forward and backward propagating mode envelopes, is $$q(z) = \frac{\pi}{i2n\Lambda}\Delta n_{ac}(z)e^{i\left(\int_0^z \frac{2\pi}{n\Lambda}\Delta n_{dc}(z')dz' - \varphi(z)\right)}.$$

In other words, a differentiable grating phase φ(z) (e.g., a slowly varying chirp or prechirp) can in theory be replaced by a dc-index $$\Delta n_{dc}(z) = \frac{n\Lambda}{2\pi}\frac{d\varphi}{dz}.$$

Pump power just high enough to initiate lasing is referred to, herein, as the threshold power $P_{th}$. It equals the quotient of the threshold gain $g_{th}$ (in units m$^{-1}$) of the cavity and the Raman gain efficiency $e_R$ (in units W$^{-1}$m$^{-1}$) of the fiber, i.e., $P_{th}=g_{th}/e_R$. At threshold, the signal power and all signal-induced nonlinearities are negligible. Thus, at threshold, the signal field in the grating can be modeled by the known linear coupled mode equations. The boundary conditions of vanishing incident signal fields at both ends of the grating result in an algebraic equation for the complex-valued propagation constant of the signal field at threshold. The real part of this propagation constant gives the signal frequency, and the imaginary part gives the threshold gain.

However, since this algebraic equation is nonlinear with respect to the propagation constant, it can have an infinite number of different solutions. The signal field that corresponds to the propagation constant having a minimum imaginary part (lowest loss) is the fundamental longitudinal mode of the cavity, which lases at the threshold gain, $g_{th}$. However, if the pump power is increased further, the (Raman) gain of the cavity will at some point exceed the imaginary part of another solution of said algebraic equation, i.e., the laser will become longitudinally multimoded and will lase at more than one frequency. This can be observed by an oscillating output power.

Figure 26:
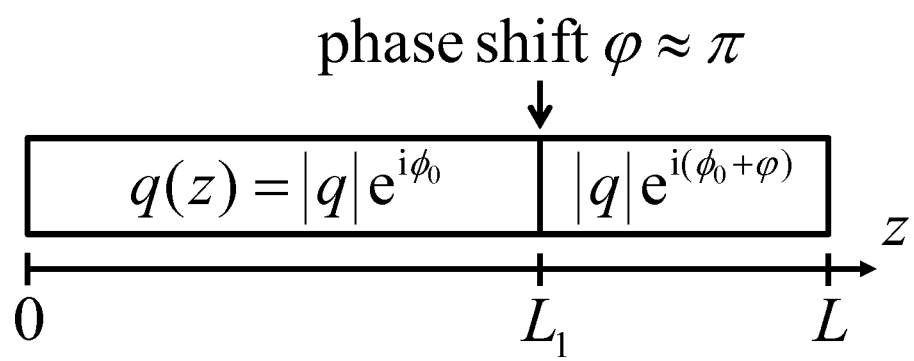
FIG. 26 illustrates a grating of length L that has a constant modulus $|q|=\pi/2n\Lambda\Delta n_{ac}$ and a $\pi$-phase shift at $z=L_1$ and no chirp.

For a grating of length L that has a constant modulus $$|q| = \frac{\pi}{2n\Lambda}\Delta n_{ac}$$

and a π-phase shift at $z=L_1$ (e.g., $L_1=0.58L$) and no chirp (see FIG. 26), the threshold gain can be approximated according to $$g_{th} \approx \alpha + 2|q|r(1+r),$$

with $r=\cos h((2L_1-L)|q|)/\cos h(L|q|)$ and the (power) loss constant α (in units m$^{-1}$). If the power loss in the grating is x dB/m, we have $\alpha=x \ln(10)/(10\ m)=x0.2303/m$. As an example, in an HNLF silica fiber with α=6.4/km (0.028 dB/m), L=12.4 cm, $L_1$=7.192 cm, |q|=90/m and $e_R$=5/(Wkm), we obtain a threshold gain $g_{th}$=0.022/m and a threshold power $P_{th}=g_{th}/e_R$=4.4 W. Increasing the grating strength, the minimum threshold power that can be theoretically achieved in this case is $P_{th,min}=\alpha/e_R$=1.28 W Embodiments of the present invention include a Raman laser with a DFB grating having a length of less than 20 cm in a Raman gain medium with a threshold power in a range of 0.08-5 W. Other embodiments a Raman laser with a DFB grating having a length of less than 20 cm in a Raman gain medium with a threshold power in a range of 1.28-4.4 W, in a range of 0.24-1 W, or in a range of 0.08-0.24 W. Yet, other embodiments of the present invention describe a Raman laser with a MB grating having a length of less than 20 cm in a Raman gain medium with a threshold power of less than 2 W, less than 1 W, or less than 0.1 W. In accordance with an aspect of these embodiments, the DFB grating may be of a length less than 14 cm.

Using an $As_2Se_3$ chalcogenide fiber for the DFB grating with α=0.23/m (1 dB/m) and $e_R$=0.95/(Wm) provides a $P_{th,min}$=0.24 W. Using a tellurite fiber for the DFB grating with α=0.0046/m (0.02 dB/m) and $e_R$=0.055/(Wm) gives a $P_{th,min}$=0.08 W.

In one embodiment of the present invention a Raman fiber laser in a chalcogenide fiber, such as $As_2Se_3$, is provided with a DFB grating having a length of less than 20 cm with a threshold power that is preferably in a range of 0.24-1 W. In another embodiment of the present invention, the DFB grating has a length of less than 14 cm. In yet another embodiment of the present invention a Raman fiber laser in a tellurite fiber is provided with a DFB grating with a length of less than 20 cm with a threshold power that is preferably in a range of 0.08-0.24 W. In accordance with an aspect of this embodiment, the DFB grating may be of a length less than 14 cm.

If the pump power is increased beyond the threshold power $T_{th}$, the (Raman) gain of the cavity will, at some point, exceed the imaginary part of another solution of said algebraic equation and the laser will become longitudinally multimoded, i.e., it will lase at more than one frequency. This can be observed by an output power oscillating in time.

The lasing wavelengths of rare-earth fiber DFB lasers are limited within the gain bandwidth of the rare-earth element that provides the gain (e.g. 1.55 mm for Erbium, 1.05 micron for Ytterbium, 2 micron for Thulium). For other wavelength regions, beyond the gain bandwidth of rare earth elements, one can rely on wavelength conversion using nonlinear processes such as second harmonic generation (SHG) and optical parametric oscillation (OPO) in nonlinear optical crystals (χ2), stimulated Raman scattering (SRS) in materials (such as silica) having χ3 nonlinearities.

Wavelength conversion based on SRS has several advantages, such as wide tunability, cascades of wavelength conversion, high (quantum) efficiency, and freedom from the design and fabrication constraints of REI doping. A schematic diagram of a known wavelength conversion device based on cascaded Raman resonators is shown in FIG. 1. Here, the laser radiation from the pump laser induces Raman gain in the fiber, and lasing at the Stokes's wave is established from the spontaneous emission or from a lasing cavity, such as can be created using a pair of fiber Bragg gratings (FBGs). The Stokes wave, once lasing, can similarly be used to lase the second order Stokes using another pair of FBGs. This process can be continued until the desired wavelength is obtained.

Since the Raman gain is typically much smaller than REI gain, higher pump powers and longer lengths are required to surpass lasing threshold. Because of the long lengths (typically >100 m), a Raman laser operates on a large number of longitudinal modes, and thus, such sources are not found suitable to produce single frequency or narrow linewidth output Raman radiation.

Recently, Raman DFB lasers that rely on Raman gain inside the grating have been proposed for achieving single frequency or narrow linewidth laser oscillation. See, for example, V. E. Perlin and H. G Winful, "Distributed Feedback Fiber Raman Laser", IEEE Journal of Quantum Electronics 37 38, (2001); Y. Flu and N. G. R. Broderick, "Improved design of a DFB Raman fibre laser" Opt. Comm. 282 3356 (2009. Despite the fact that the Raman gain per unit length is small (~0.01 dB/m/W), because of the high-Q of the cavity, the intensity of the signal in the cavity is expected to be strong enough to cause significant depletion of the pump power and thus, effective usage of the pump.

A uniform 1 meter long fiber Bragg grating without a $\pi$ phase shift has been considered. See, for example, V. E. Perlin and H. G Winful, "Distributed Feedback Fiber Raman Laser", IEEE Journal of Quantum Electronics 37 38, (2001). Using a linear analysis, it can be demonstrated that the threshold can be below 1 W. It has been theoretically shown that a uniform 20 cm cavity with a $\pi$ phase shift offset from the physical center of the grating can be operated with a threshold close to 1 W and a slope efficiency of 80% in Y. Hu and N. G. R. Broderick, "Improved design of a DFB Raman fibre laser" Opt. Comm. 282 3356 (2009).

While these predictions offer attractive performance, the very long gratings of 1 meter and even of 20 cm pose serious problems in fabrication and will result in compromised performance due to packaging constraints, such as temperature variations, bend-induced stresses, vibration and so forth. No actual DFB Raman fiber lasers with a phase shift in the grating and a DFB length of less than 20 cm has been demonstrated or realized until now. Further, generation of Raman radiation with a DFB of such a small length (less than 20 cm) was quite unexpected.

Raman DFB lasers have the potential to convert broadband radiation into single frequency radiation with large conversion efficiency in a length short enough to avoid SBS backscattering.

Studies have considered the effect of certain grating imperfections on lasing characteristics, showing that such lasers should be robust to white phase and amplitude noise imposed on the grating profile. J. Shi and M. Ibsen "Effects of phase and amplitude noise on $\pi$ phase-shifted DFB Raman fibre lasers" Bragg Gratings Poling and Photosensitivity, JThA30 (2010). Typical grating imperfections are not random, however, and often result from particular sources in the writing apparatus and therefore are not well characterized as white noise.

In practice, there are a number of problems that has made it difficult to achieve single frequency Raman lasing using DFB structures. These include 1) fiber loss due to e.g., the UV exposure during grating writing, 2) difficulty in fabricating long gratings, 3) non-uniformities in Bragg wavelength along the device, 4) Kerr-nonlinearity induced Bragg-wavelength variation, 5) requirement of high pump powers, 6) thermal variations along the grating due to pump absorption, 7) spatial overlap of the optical pump and signal field with the gain medium (e.g. the core) and the index modulation of the grating, and 8) spectral overlap of the pump and the DFB grating. These factors result in a large threshold for lasing, small output power, and inefficient usage of pump power. As described below, although experimental results were developed in accordance with aspects of the present invention with a very good gain fiber (low loss, high Raman gain coefficient), high quality laser assembly (low splice loss) and excellent Bragg grating design and fabrication (clean spectrum, accurate phase shift, narrow linewidth), the performance was significantly different from that predicted in the above-mentioned prior art simulations, which suggests that additional mechanisms may be present that disrupt lasing performance.

All of the previous simulations of Raman fiber DFBs have required gratings of 20 cm or longer for successful operation. However, it would be advantageous if gratings could be shorter in length. For instance, fiber gratings may be fabricated with phase masks. Current technology does not allow phase masks to be fabricated at lengths of 20 cm. Therefore, such gratings at 20 cm length are difficult to fabricate.

We have discovered and teach herein how to extend the Raman fiber DFB design space to gratings less than 20 cm. We have discovered that gratings shorter than 20 cm can be made to act as Raman fiber MB narrow linewidth sources.

While a cavity shorter than 20 cm is relatively easy to fabricate using current technologies, this results in a few fold increase in the threshold pump powers to about 5 W, which can, however, be easily achieved by a high power rare earth or Raman fiber lasers that are commonly available. Use of fibers having large Raman gain coefficient and low intrinsic losses (~0.02 dB/m) also favor making short Raman DFB lasers with a reasonably low pump power (less than 5 W).

The present invention discloses the operation of a Raman DFB laser and other Raman laser configurations, their improved design, as well as high power laser systems using the same. More generally, the generation and modulation of narrowband light using conventional pump sources and employing Raman gain and varying levels of instantaneous nonlinearity such as the third order Kerr nonlinearity, is described herein.

Also, generation of narrow linewidth, high power signals at wavelengths not accessible by REI doping is described. Further, optimized optical fibers, whose gain and photosensitivity allow for optimal performance of a Raman fiber DFB laser, are depicted.

One aspect of the present invention is to use a DFB fiber grating structure that uses gain initiated by pump radiation launched in the forward direction, backward direction, or both. The DFB grating structure has at least one discrete phase structure ($\pi$-phase shift), located at the center or offset slightly from the center. Laser radiation is extracted in the forward or backward directions (relative to the pump), or both using e.g., a WDM coupler. Isolation may be provided at the laser output to prevent unwanted signal feedback into the laser cavity. Such optical isolation is a commonly known technique to improve laser performance and stability.

The single frequency or narrow linewidth Raman lasing and the residual pump wave exiting the DFB grating can be further propagated through a length of fiber to produce additional gain in a MOPA (master amplifier power amplifier) scheme to further amplify the Raman (Stokes) signal.

In one embodiment of the present invention, a Raman DFB laser is placed inside the resonator of a cascaded Raman resonator, which produces light downshifted by one Stokes order from the output of the DFB laser. In this architecture, the Raman resonator provides pump light to the DFB laser to more efficiently utilize the pump wave and increase the conversion of broadband pump to single frequency or narrow linewidth Stokes wave.

In another embodiment of the present invention, the pump wave is allowed to propagate through a series of Raman DFB structures having different Bragg wavelengths within the Raman gain spectrum to produce a multiple number of single or narrow frequency lasing outputs.

In one embodiment of the present invention, a highly non-linear, birefringent, or polarization maintaining fiber (e.g. PANDA) fiber is used as the Raman gain medium to obtain Raman oscillation with keyed polarization state.

In another embodiment of the present invention, the Raman DFB laser is placed inside a rare earth (e.g. erbium, Yb) fiber laser cavity, (linear, ring or Fabry-Perot) to allow intra-cavity wavelength conversion.

In one embodiment of the present invention, DFB fiber gratings with non-uniform distribution of Bragg wavelength (along the length) are used. This pre-chirp helps null out the effect of self/cross phase modulation or thermal heating owing to the intense forward and backward propagating intra-cavity field.

In another embodiment of the present invention, the DFB cavity is designed to operate at two wavelengths separated by Brillouin shift. Raman pumping would then cause lasing at both wavelengths. However, once lasing, stimulated Brillouin scattering (SBS) would transfer energy to the higher wavelength, thus increasing the power of this mode.

In another embodiment of the present invention, the fiber DFB laser and/or any or all of the amplifiers uses fiber having a high (greater than a few Watts) SBS threshold. High SBS threshold may be achieved using well-known methods, such as strain and temperature segmentation or through a dopant profile that results in an antiguiding acoustic waveguide, while maintaining a functioning optical waveguide.

In one embodiment of the present invention, the fiber DFB cavity is inscribed in a fiber designed to have very low temperature sensitivity such that the effective index of the waveguide changes minimally with temperature. For example, such low sensitivity can be achieved with Boron (B) and Germanium (Ge) doping. B—Ge doping produces glass with a lower thermal variation in the effective refractive index due to the negative temperature coefficient of the material refractive index introduced by the B doping. This doping achieves very low temperature sensitivity for various laser parameters, including wavelength and phase noise. Note that such doping may be used with either Raman gain or REI gain to reduce temperature variation and noise.

In general, the refractive index temperature dependence will vary as a function of the dopants used to fabricate the waveguide. Such dopants include for instance Ge, B, P, F, Al, La, Ta, and various rare earth ions, and combinations of these. In general, it is possible to achieve a given waveguide design with various dopant levels. When these dopant levels are adjusted to produce the lowest variation of modal index with respect to temperature, then a laser incorporating this waveguide will be expected to have the lowest noise characteristics. Note that this can be used in any fiber laser, and the benefit would be lower noise in each case.

We now describe the principle of this invention and an example in greater detail. We first elate temperature dependence of the Bragg wavelength to fundamental thermal frequency noise. We then show that fundamental thermal frequency noise may be reduced through proper choice of dopants.

The Bragg wavelength of a fiber Bragg grating may be expressed as:

$$\lambda_{Bragg} = 2n\Lambda_{grating}$$

Here, $\lambda_{Bragg}$ is the Bragg wavelength, n is the effective index of the mode resonant with the grating, and $\Lambda_{grating}$ is the grating period. The temperature derivative of the grating Bragg wavelength may be expressed as:

$$\frac{d\lambda_{Bragg}}{dT} = 2n\Lambda_{grating}\left[\frac{dn}{ndT} + \frac{1}{\Lambda_{grating}}\frac{d\Lambda_{grating}}{dT}\right] = \lambda_{Bragg}\left[\frac{dn}{ndT} + \frac{d\epsilon}{dT}\right]$$

The first term in brackets is the thermo-optic coefficient and the second term is the thermal expansion coefficient of the fiber. Typically, the first term is much larger in silica optical fibers. The small additional change due to a temperature induced change in fiber radius is neglected in this formula.

The variation of the Bragg wavelength with temperature can be related to the amount of fundamental thermal frequency noise that a DFB laser using that grating as a cavity would have. In a steady state, the frequency noise is related to the time derivative of the phase of the laser E-field $\psi(t)$. Accordingly, the frequency noise is proportional to an integral over the fiber volume:

$$\psi(t) \propto \int \left[\frac{dn}{ndT} + \frac{d\epsilon}{dT}\right]\Delta T(t,r)|e(r)|^2 d^3r$$

where e(r) is the radial dependence of the E-field, $\Delta T$ is temperature fluctuation vs space and time, and the term in brackets is the sum of the thermo-optic and thermal expansion coefficients, just as in the formula for the variation of the Bragg wavelength with temperature. Thus, a reduction in variation of the Bragg wavelength with temperature is expected to give a reduced thermal noise.

It is known that the temperature sensitivity of the Bragg resonance wavelength of a fiber grating inscribed into a fiber with a B—Ge doped core is less than that of a core doped with Ge alone or Ge and Er. It has been shown that the temperature dependence of the Bragg wavelength in B—Ge doped fiber Bragg gratings is 10.69 pm/C, whereas in Ge—Er fiber Bragg gratings, the Bragg wavelength temperature dependence is 14.45 pm/C. Therefore, a thermal fluctuation in the B—Ge doped fiber will result in a small change in the Bragg wavelength of a grating in that fiber. From the arguments above, such a decreased temperature dependence will reduce the fundamental noise in a laser that uses such a grating. While this example compared fibers with B—Ge and Ge—Er doping, it is believed that, for instance, B—Ge—Er doped fibers also will have a lower variation of Bragg wavelength with temperature than fibers with Ge—Er doping. Thus, a B—Ge—Er doped fiber laser incorporating such a fiber grating would have lower phase noise than the same fiber laser using a Ge—Er doped fiber. Other combinations of dopants examples are also possible. Moreover, a Raman fiber DFB laser using a B—Ge doped fiber would have a lower fundamental thermal noise than a similar laser that relies of Er gain in a Er—Ge doped fiber. The doping described herein can be used in any of the Bragg gratings described herein, in accordance with aspects of the present invention.

In one embodiment of the present invention a Raman laser is provided by using a grating structure in a Raman gain medium. In another embodiment of the present invention a Raman laser is provided using a DFB fiber grating where the active medium is a Raman gain medium and the DFB fiber grating has a length that is less than 20 cm. Another embodiment of the present invention depicts a Raman laser using a DFB fiber grating, where the active medium is a Raman gain medium and the DFB fiber grating has a length of less than 19.5 cm. Additional embodiments include the DFB grating having a length of less than 18 cm, of less than 15 cm, or of less than 14 cm. Further embodiments include DFB fiber gratings having a length of about 14 cm or a length of about 12 cm.

An experimental setup used to investigate the present invention is now described. A DFB fiber grating structure was written in a Raman fiber (manufactured by OFS Fitel, LLC, having an office at 25 Schoolhouse Road, Somerset, N.J. 08873) having a NA=0.22, effective area 18.7 um$^2$ (at 1550 nm), cutoff wavelength <1050 nm, and Raman gain efficiency for unpolarized light of 2.5/W/km. The fiber was loaded with deuterium increase its photosensitivity. A 124 mm long grating with a pitch of $\Lambda_{grating}$=547.30 nm was inscribed using a direct write system with a CW 244 nm inscription wavelength. The length of the Raman gain fiber was 14 cm with roughly 21 cm of single mode fiber on either side of the grating. The resulting Bragg wavelength was 1583 nm. The grating profile was uniform and a π phase shift (or equivalently, $\Lambda_{grating}/2$) was placed 8% off center at 71.92 mm.

Figure 2:
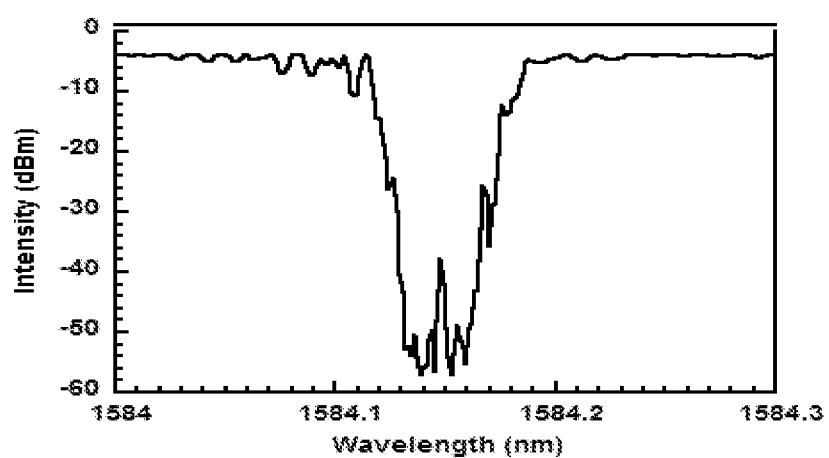
FIG. 2 illustrates a grating transmission spectrum of a Raman DFB fiber Bragg grating, according to the prior art.

The grating transmission spectrum is shown in FIG. 2. A visual fit of the grating spectrum (transmission width and depth) to a uniform 124 mm phase shifted grating gave an index modulation of ~3.5×10$^{-5}$. The corresponding grating coupling constant was κ=69(1/m).

Figure 3:
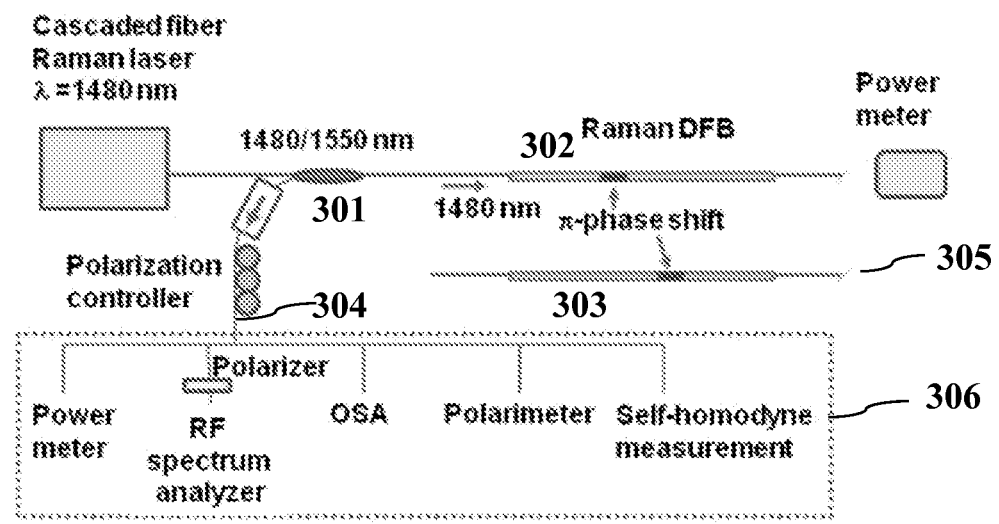
FIG. 3 illustrates a setup used to demonstrate single frequency operation in a Raman DFB laser in accordance with an aspect of the present invention.

The setup used to demonstrate the operation of single frequency operation in Raman DFB laser is shown in FIG. 3. The pump laser used was a high power cascaded Raman fiber laser producing a maximum of 81 W at 1480 nm. The SSMF (standard single mode fiber) pump output was spliced to a 1480/1550 WDM 301, which was then spliced to the DFB fiber 302. An isolator in the optical path ensured low feedback to the DFB cavity from the backward direction, while the DFB fiber pigtail in the forward direction was angle cleaved.

The grating was placed on a metal bar and surrounded by a thermally conductive paste to reduce thermal variations. The grating was tested such that the phase shift was facing 1) inward (towards the pump) in 302 and 2) outward (away from pump) in 303. A backward optical output 304 of the laser was coupled to one of several measurements 306 as shown in FIG. 3. These measurements were, power, spectrum (an OSA), linewidth (delayed self-homodyne interferometer+RF spectrum analyzer), a polarizer and RF spectrum analyzer, and a polarimeter. During the operation, very little pump power was absorbed, making the pump power at the output of the laser very large compared to the laser signal output. In a further embodiment of the present invention the DFB Raman laser operated with the outward facing phase shift fiber 303 with an outward optical output 305.

Experimental Results

Figure 4:
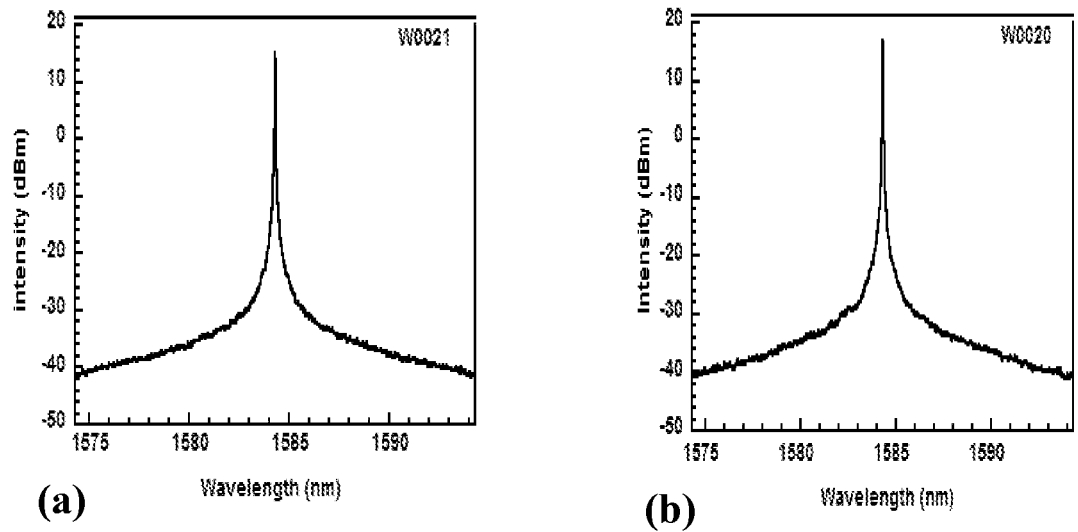
FIGS. 4a and 4b illustrate the output spectrum of a laser (measured through the WDM and the isolator), where the phase-shift was facing inward and outward, respectively, in accordance with an aspect of the present invention.

The output spectra of the laser measured through the WDM and the isolator are shown in FIGS. 4a and 4b, where the phase-shift was facing inward and outward, respectively. Oscillation at the same wavelength of 1584 nm was observed for both the orientations.

Backward signal power versus pump power is shown in FIG. 5a, where the phase shift was facing inward (toward the pump). The threshold pump power was 38.7 W and the maximum output power was 65 mW. A small hysteresis was observed near threshold. The laser turned on at a pump power of 38.7 W and turned off at a power of 36.3 W. The signal power versus pump power curve is nonlinear. Slope efficiency varied from 0.3% to 0.07%. FIG. 5a also shows the transmitted pump power. At maximum pump power, the transmitted pump had decreased by less than 4 W as measured by comparing the detectors as the input and output of the laser. The loss is mostly attributed to the splice loss between the SMF fiber and the Raman fiber in which the DFB was inscribed, as well as UV induced loss in the grating resulting from the UV inscription process.

FIG. 5b shows the backward signal power vs. pump power, when the phase-shift was facing outward. An output power of about 50 mW was obtained for a maximum pump of 80 W. By comparing FIGS. 5a and 5b, it is clear that larger power can be obtained from the direction of offset of the π phase-shift.

Figure 6:
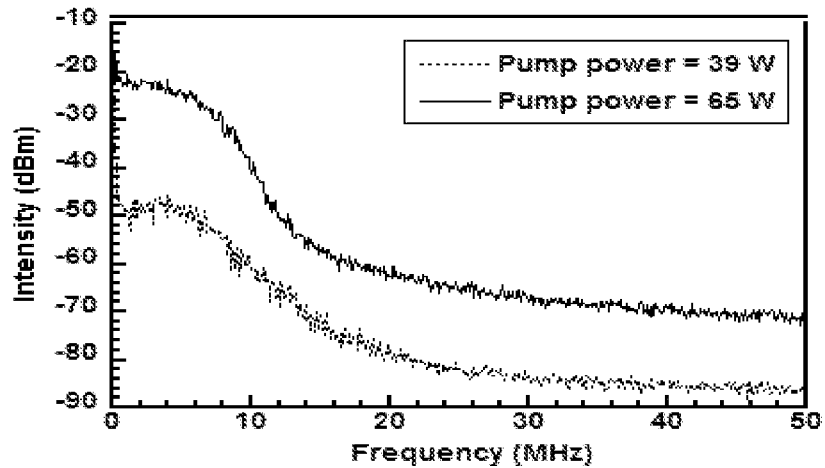
FIG. 6 illustrates linewidth measured using a delayed self-homodyne interferometer at pump powers near threshold and near the maximum pump power in accordance with various aspects of the present invention.

FIG. 6 shows the linewidth measured using a delayed self-homodyne interferometer at pump powers near threshold and near the maximum pump power. In both cases the full-width at half maximum of the optical bandwidth was estimated to be 6 MHz from the 3 dB width of the RF spectrum. The degree of polarization (DOP) using a polarization analyzer was measured, and found to be almost linearly polarized, that is, DOP≈100%.

Figure 7:
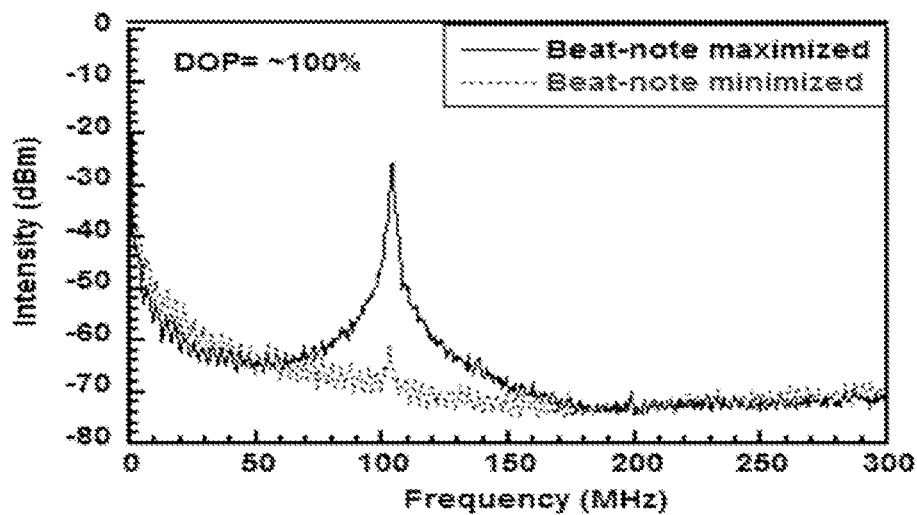
FIG. 7 shows a beat note at 100 MHz, indicating the presence of a second lasing mode, in accordance with an aspect of the present invention.

The RF spectrum was measured on a larger scale. FIG. 7 shows a beat note at 100 MHz, indicating the presence of a second lasing mode most likely due to lasing on dual polarization. Fiber DFBs have been shown to lase on two polarizations. To verify that the beat note is due to an additional polarization mode, we placed a set of paddles followed by a polarizer in front of the RF spectrum analyzer. FIG. 7 shows that the beat note could be nulled by adjusting the paddles. The DOP of the output was also measured and found to be near 100%. These measurements strongly indicate that the laser was operating on the two polarizations of a single longitudinal mode.

In accordance with an aspect of the present invention the bandwidth of the Raman radiation generated by the DFB laser is about 6 MHz. A bandwidth is defined at the frequencies at which the optical power is 50% (3 dB) of its peak power. In accordance with an aspect of the present invention the bandwidth of the Raman radiation generated by the DFB laser is greater than or equal to 6 MHz but smaller than 100 MHz. In accordance with an aspect of the present invention, the bandwidth of the Raman radiation generated by the DFB laser is about or smaller than 1 GHz but greater than 100 MHz.

As previously discussed, Raman radiation herein is defined as radiation that arises from Raman scattering. There are other ways to characterize Raman radiation as known to one of ordinary skill, including radiation that arises from Raman gain. In the following, different high power laser systems that use the Raman DFB are shown.

Figure 8A:
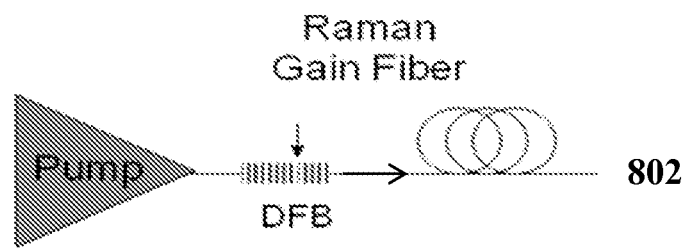
FIGS. 8a and 8b show schematic diagrams of a Raman DFB laser in a master oscillator and power amplifier (MOPA) scheme, in accordance with an aspect of the present invention, with FIG. 8b including an isolator to isolate the amplifier from the laser and suppress unwanted reflections.

FIG. 8a shows a schematic diagram of a Raman DFB laser in a master oscillator and power amplifier scheme with an optical output 802 that provides narrow band Raman radiation. The large amount of residual pump power transmitted through the DFB grating could be coupled to additional Raman fiber to make an amplifier for the narrowband Raman radiation, having optical output 802. Thus, the total efficiency of the laser could be substantially higher than the DFB laser slope efficiency indicates. The amplifier fiber could be designed to have an increased SBS threshold. This could be done using known methods such as design of an antiguiding acoustic core, the use of thermal or strain gradients along the fiber, use of concatenation of fibers with differing SBS frequency response, or other known methods.

Figure 8B:
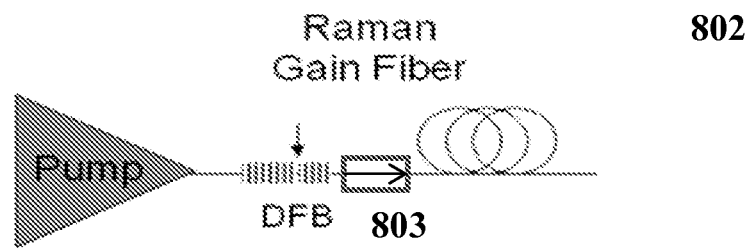

It is also common practice to place a means of optical isolation after the DFB grating, as shown in FIG. 8b, to isolate the DFB grating from any backward propagating signal light. Such an optical isolation would allow the pump to pass through to the amplifying fiber. This could be accomplished using a broadband isolator, or using wavelength division muxlitplexers (WDMs) to allow the pump to by-pass a more narrowband isolator. In all of the MOPA schemes of this invention, such isolation may be assumed to be present if necessary to ensure proper laser operation.

In general, the pump used in the inventive embodiments, such as the pump shown in FIGS. 8a and 8b, can be either continuous-wave or pulsed, such as Q-switched. If pulsed, the pulse duration should be more than 2nL/c, where n is the refractive index, c is the speed of light, and L is the effective length of the cavity, enhanced by the Q factor.

In general it is possible to modulate the pump power, such as, for example, by constructing the pump using Raman amplification of a modulated seed source. If the Kerr nonlinearity is sufficiently high, power variations would be translated into wavelength and phase variations. Thus, the Raman DFB could be phase modulated via the pump power. The grating cavity, Raman gain, pump level, and pump modulation level, among other parameters would have to be adjusted to reduce output power variations. Alternatively, if the Kerr effect were sufficiently small, the pump power modulation could provide amplitude modulation of the signal.

In general, a Raman DFB laser can exhibit substantial hysteresis in both the output power and polarization properties. In order to overcome this hysteresis, a large initial pump pulse could be used, followed by a lower power CW pump. The lower power pump could then access lower output powers.

Hysteresis could also be overcome with other initial perturbations, such as thermal, strain, electrical, or non-pump radiation. Such initial perturbations would cause the laser to achieve the desired lasing state. These initial perturbations could then be removed and the laser would continue lasing as desired. Because of the nonlinear nature of the Raman DFB, there may be more than one steady state lasing solution for a given input pump power and pump time dependence. Various perturbations, including thermal, strain, electrical, or non-pump radiation, and pump variations could allow the laser to transition from one state to another.

The lowest noise operation state of the laser would be the state with the least coupling between phase and amplitude. This is achieved when the laser is operating at lowest power and when the power inside the cavity is as low as possible to still allow lasing. Ideally, the Kerr induced distortions of the grating profile would be minimized. In this case, pump or signal power fluctuations would have minimal impact on laser phase noise. This would be a quasi linear operation of the laser. It would occur slightly above threshold. In general, such a state could be accessed by starting the laser with a higher pump power pulse, and then lowering the pump power to achieve the lower signal power state.

A Raman DFB laser can be made to switch between single and dual polarization lasing. Such a source can be useful for sensing applications. Sufficient nonlinear polarization rotation and linear birefringence would ensure appropriate polarization properties, hysteresis and dynamics.

Pump radiation can also be applied from the other side of the Raman gain fiber through a WDM coupler. This would further enhance the power of the desired Stokes wave.

The wavelength of the Raman lasing can be varied by altering the temperature of the fiber, such as by applying a metallic coating along the grating and applying an electric current to the coating. Other means to control the wavelength can be applied to the Raman DFB cavity. For example, the cavity could be placed in a heater or cooler. It could be subjected to varying or non-uniform temperature distribution along its length. It could be put under strain, either extension or compression, or bending. In particular, the cavity could be placed in a V groove and bonded to a substrate such that when the substrate is bent, the wavelength would change.

Also, to suppress the stimulated Brillouin scattering in the amplifier section of the cavity, several measures can be taken. One can use phase dithering (modulation) of the pump wave that is applied to the Raman DFB laser at a repetition rate of several tens of MHz. It is also possible to apply distributed strain or temperature variation along the length of the Raman gain fiber that will vary the Brillouin shift along the length and thus, increase the Brillouin threshold.

In general, the Raman DFB laser can be placed within a cascaded Raman laser cavity. A cascaded Raman laser typically comprises a pump laser and one or more fiber laser cavities that are resonant at frequency that are one Raman order from each other. An example of a cascaded Raman fiber laser is given in G. Grubb et al. "1.3 µm Cascaded Raman Amplifier in Germanosilicate Fibers" Optical Amplifiers and their Applications Conference, PD3 1994, which is incorporated herein by reference. Several examples of how to place a fiber DFB grating in a cascaded Raman fiber laser are given for instance in FIGS. 9 to 13. Note that it is also possible to cascade one or more Raman DFB lasers.

Figure 9:
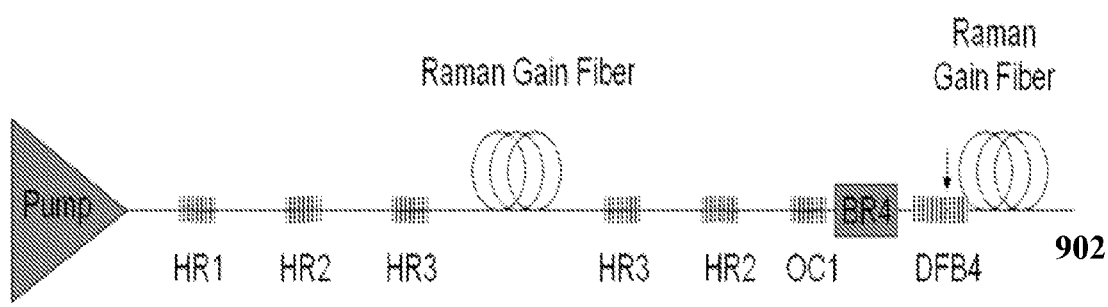
FIG. 9 shows a configuration using an external DFB pumped by a cascaded Raman laser to produce high-power narrow linewidth (<1 GHz) laser radiation in accordance with an aspect of the present invention

FIG. 9 shows a configuration which uses an external DFB grating and MOPA to produce high-power narrow linewidth (<1 GHz) laser radiation. Here, HR1, HR2, and HR3 are fiber Bragg gratings providing high reflection at wavelengths 1, 2, and 3, respectively (for example, 1175 nm, 1239 nm, and 1310 nm) and OC1 is a weak output coupler at wavelength 1. The wavelength of the fiber DFB grating is larger than all other wavelengths and is larger by an amount nominally equal to the Stokes shift in the fiber (e.g. typically 13.2 THz in silica fiber) for example, around 1390 nm. BR4 is a band rejection filter at a fourth wavelength. This may be included to mitigate the effect of back scatter radiation from the DFB. More wavelengths could be added to the cascade. Raman radiation is provided on optical output 902.

Figure 10:
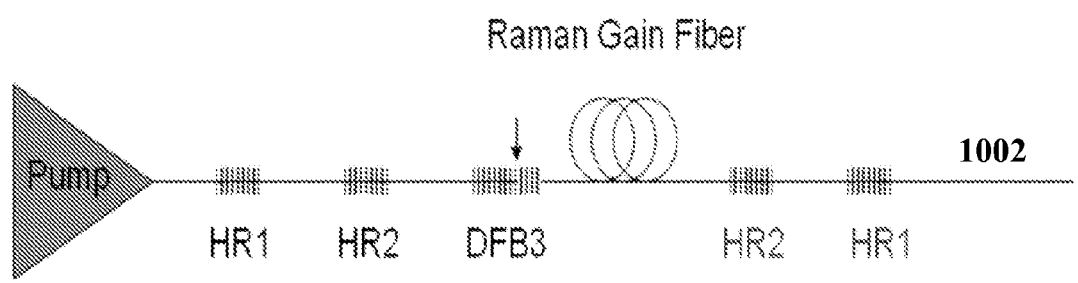
FIG. 10 illustrates a Raman DFB laser placed in the inner most resonator of a cascaded Raman laser system that allows efficient utilization of pump power through recycling of the pump power in accordance with an aspect of the present invention.

In FIG. 10, the Raman DFB laser is placed in the inner most resonator (consisting of the two HR2 FBGs) of a cascaded Raman laser system that allows efficient utilization of pump through recycling of pump. Here, the wavelengths $\lambda_1$ and $\lambda_2$<the wavelength of the DFB grating $\lambda_3$, preferably offset by Raman shift. More wavelengths could be added to the cascade. Only two are shown for clarity. Raman radiation is provided on optical output 1002.

Figure 11:
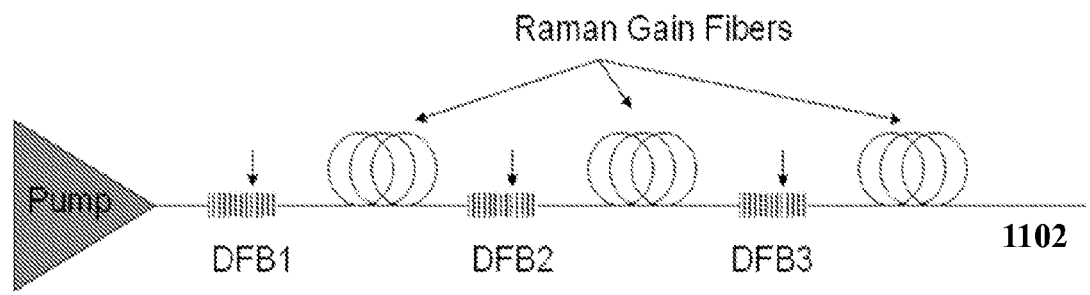
FIG. 11 shows a high power laser/amplifier system consisting of multiple Raman DFB lasers and Raman gain fibers, utilizing a single pump source in accordance with an aspect of the present invention.

FIG. 11 shows a high power laser/amplifier system consisting of multiple DFB gratings and Raman gain fibers that are pumped by a single pump source. In one embodiment, the wavelengths of the DFBs lie within the Raman gain spectrum of the pump wave. The output of the system would consist of multiple single-frequency high-power laser oscillations. Each DFB grating herein can be called an instance of a Raman fiber laser. Each instance may include a length of Raman gain fiber. In this embodiment, the gain fiber lengths may be short or long, but less than 20 cm, to provide different power for each wavelength. In another version of this embodiment, one or all of the gratings are written in the same length of fiber. The gratings may also be superimposed in the same length of fiber. In this case only the last length of Raman gain fiber to the far right would be needed. Raman radiation is provided on optical output 1102.

In a second embodiment, each DFB sits roughly one Raman order lower in frequency, i.e., $\lambda_1<\lambda_2<\lambda_3$, where $\lambda_1$ is the Bragg wavelength of DFB1, $\lambda_2$ is the Bragg wavelength of DFB2 and $\lambda_3$ is the Bragg wavelength of DFB3. The largest power will be at $\lambda_3$. Further, substantially all of the power will be at $\lambda_3$ and the pump source will benefit from the low noise pumping of all the orders. This source will have low noise and narrow linewidth in addition to being wavelength agile.

Figure 12:
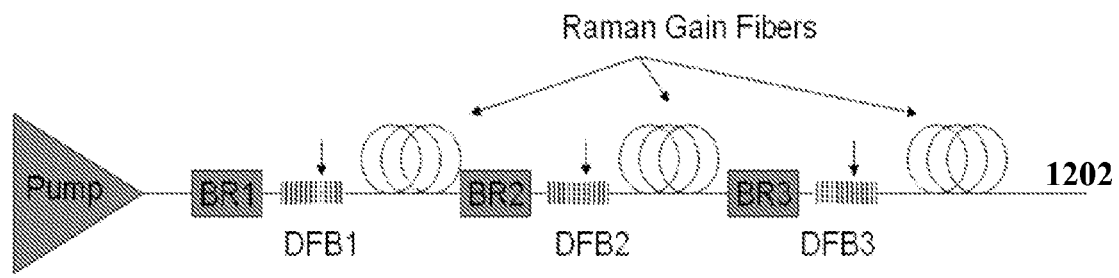
FIG. 12 illustrates the configuration of FIG. 11 incorporating band rejections filters to prevent light from propagating in the backward direction in accordance with an aspect of the present invention.

In the system shown in FIG. 12, band rejections filters (BR1, BR2, BR3 etc.) can be incorporated to prevent light from propagating in the backward direction. This can be applied to both a multi-wavelength laser and to a low noise high power single frequency laser. Raman radiation is provided on optical output 1202.

Figure 13:
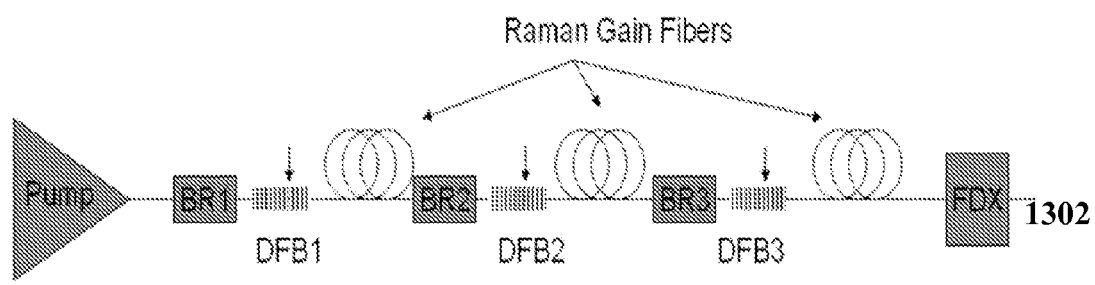
FIG. 13 illustrates the configuration of FIG. 12 terminated by a frequency doubling nonlinear crystal to produce second harmonic of the wavelength in accordance with an aspect of the present invention.

An aspect of the invention includes terminating the configuration shown in FIG. 12 by a frequency doubling crystal (FDX) to produce a second harmonic of the wavelength $\lambda_3$ of DFB3. This is depicted in FIG. 13. Other nonlinear optical components, such as nonlinear crystals (bulk or periodically-poled), parametric amplifiers, higher harmonic generators, sum/difference frequency generators, and the like could also be placed beyond the output of this laser. Such devices would cover the enhanced capabilities of narrow-band agile wavelength with high power coupled into such nonlinear optics systems. The output of such systems could be higher harmonics, sum frequencies, THz radiation, and other nonlinearly generated radiation. Raman radiation is provided on optical output 1302.

It is possible that if the second order nonlinearity (or some other order nonlinearity) is large enough, the DFB grating could produce a harmonic output through intra cavity higher harmonic generation. For instance, if the fiber waveguide had a second order nonlinearity, induced through, for instance thermal or UV poling, it could generate a second harmonic within the cavity. If phase matching was not possible, the DFB grating or an additional grating could provide sufficient phase matching to allow for the generation of the higher harmonic light. Quasi phase matching in nonlinear crystals could also be used to achieve efficient wavelength conversion through phase matching. Embodiments of the invention also include using waveguides inscribed on nonlinear crystals with a second order nonlinearity and periodically-poled structures to allow quasi-phase matching, such as PPLN, PPLT, or PPKTP.

While such laser embodiments require lasing one Stokes shift below the pump, it is possible to lase on the anti Stokes line with sufficient pump power and introduce optical phonon radiation into the fiber waveguide. To enhance such an effect, the optical loss would be large at the Stokes wavelength range, depressing SRS buildup. This can be achieved through design of filter fibers, or incorporation of other loss mechanisms such as discrete filters or absorbers. The optical phonons generated from SRS could then be employed in the anti-stokes wavelength range. A DFB in this range with sufficiently high Q would capture the anti-stokes light and lase.

Figure 14:
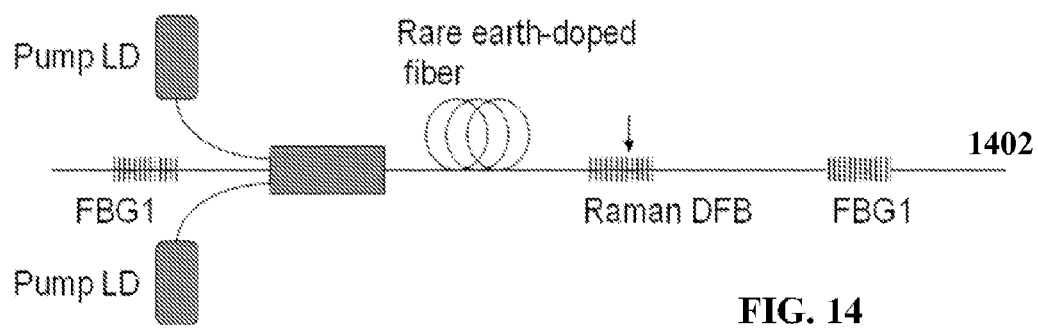
FIG. 14 shows a configuration where the Raman DFB laser is placed inside a REI-doped fiber laser cavity and the DFB grating has a wavelength preferably offset by one Stokes shift, in accordance with an aspect of the present invention.

FIG. 14 shows a configuration where the Raman DFB is placed inside a REI-doped fiber laser cavity, (e.g. Er, Yb or Er/Yb) and the DFB has a wavelength preferably offset by one Stokes shift. The REI section is pumped by a pump laser through a coupler. Raman radiation is provided on optical output 1402.

Since the intra-cavity signal inside a laser can be higher than the output signal, a higher efficiency of wavelength conversion is expected. The embodiment of FIG. 14 can be extended to multiple Raman orders by including FBG2, FBG3, etc.

Figure 15:
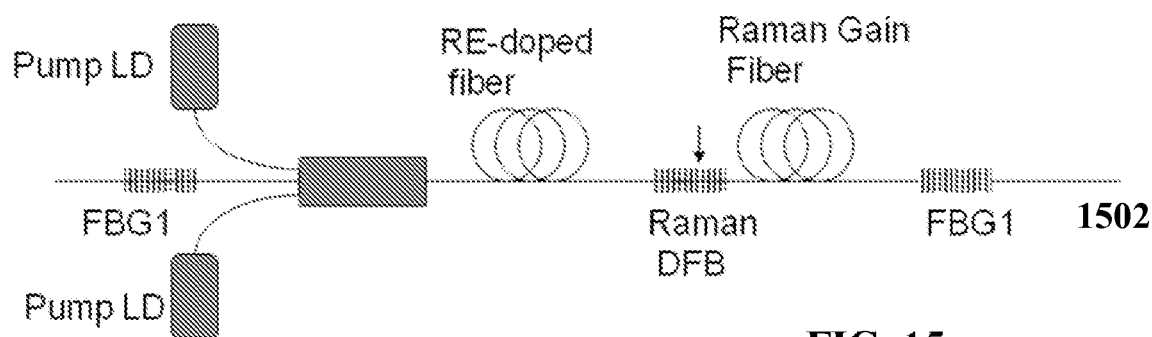
FIG. 15 illustrates a Raman gain fiber incorporated to act as a MOPA inside the rare-earth fiber laser in accordance with an aspect of the present invention.

In the configuration shown in FIG. 15, a Raman gain fiber can also be incorporated to act as a MOPA inside the rare-earth fiber laser. Raman radiation is provided on optical output 1502. The Raman radiation exiting the Raman DFB is being amplified in the Raman gain fiber that follows the Raman DFB. Both the Raman DFB and the Raman fiber are pumped by the resonant lasing field arising from the rare earth (RE) fiber and fiber Bragg gratings (two FBG1s).

Figure 16:
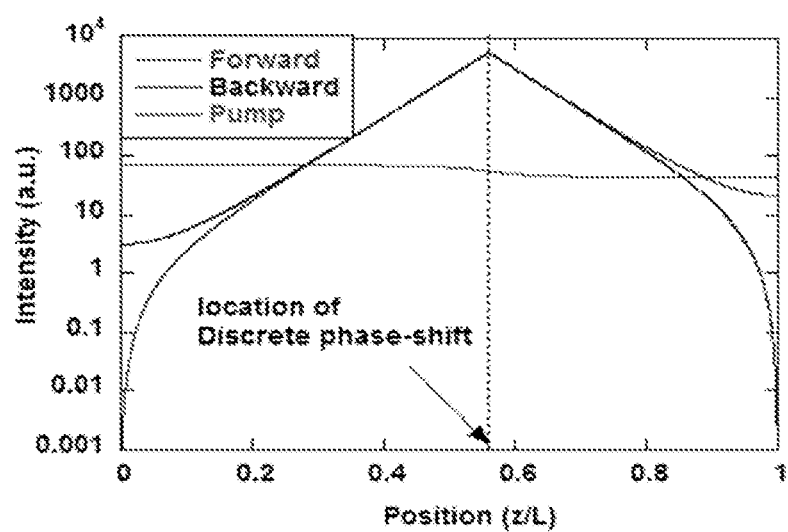
FIG. 16 illustrates a simulation of the intra-cavity signal in the forward and backward directions propagating in a Raman DFB laser, in accordance with an aspect of the present invention.

According to an embodiment of the present invention, a Raman DFB laser can have a uniform Bragg wavelength along the device. A simulation of the intra-cavity signal in the forward and backward directions is shown in FIG. 16. The simulation uses known nonlinear coupled mode equations with Raman gain and Kerr nonlinearity. The large intensity of the intra-cavity signal can cause significant self/cross phase modulation, which has the adverse effect of reducing the slope efficiency of the Raman DFB.

With the Kerr nonlinearity coefficient $\gamma$ and the powers $P_f$, $P_b$ and $P_p$ of the forward and backward propagating Stokes waves and the pump wave, respectively, the nonlinear phase shift per unit meter for the forward propagating Stokes signal can be approximated as, $$\phi_{nonlinear,forward}(z)=\gamma(P_f(z)+2P_b(z)+2P_p(z))$$

For the backward wave, the nonlinear phase change can be written as, $$\phi_{nonlinear,backward}(z)=\gamma(2P_f(z)+P_b(z)+2P_p(z))$$

Figure 17:
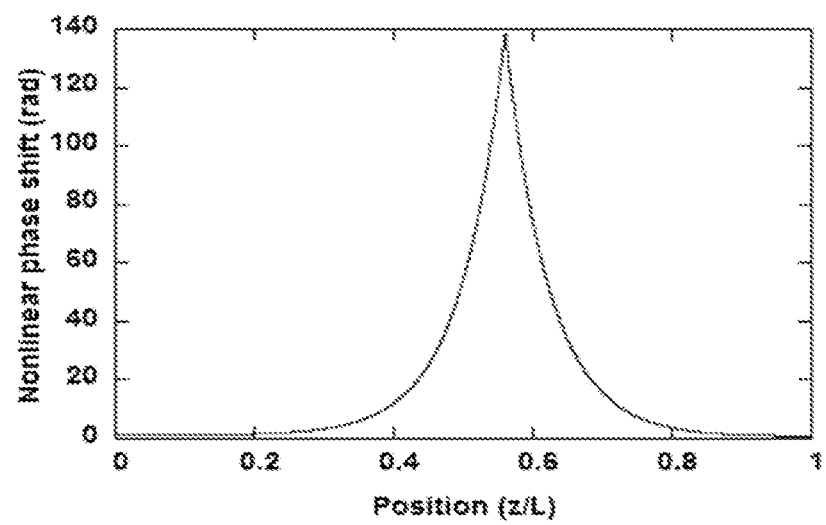
FIG. 17 illustrates a non-linear phase shift along a Bragg grating in a Raman DFB laser, in accordance with an aspect of the present invention.

In the region where the intensity is large, the nonlinear phase change for the forward and backward field is almost the same, even in the presence of an offset in position in the discrete phase shift from the grating center. The nonlinear phase shift due to Kerr nonlinearity along the DFB cavity of FIG. 16 is shown in FIG. 17. This nonlinear phase shift can be compensated by applying pre-chirp along the device. With the effective index n, the necessary pre-chirp in Bragg wavelength can be expressed to the first order as, $$\Delta \lambda_{Bragg,nonlinear} = \lambda_{Bragg,nonlinear}(z) - \lambda_{Bragg} = -\phi_{nonlinear}(z)\frac{\lambda_{Bragg}^2}{2\pi n}$$

A typical profile of the pre-chirp that can be applied to the cavity of FIG. 16 to compensate for the nonlinear effects is shown in FIG. 18.

The corresponding required pre-chirp in grating phase (phase of the complex-valued mode coupling coefficient q(z) as defined above) is $$\phi_{grating,nonlinear}(z) = -2\int_0^z \phi_{nonlinear}(z')dz'$$

The Kerr-induced phase in the integrand can be found, e.g., by solving the nonlinear coupled mode equations.

Another effect that is detrimental to the efficient operation of the Raman DFB laser is temperature variation along the length of the DFB cavity due to absorption of the Stokes waves and the pump wave inside the cavity. Due to the radius of applicable optical fibers being very small at only tens to hundreds of microns, the radial temperature gradient is dominant, and the longitudinal heat flow can be neglected. Hence, with the absorption coefficients $\alpha_s$ and $\alpha_p$ at the Stokes and pump wavelength, respectively, the heating-induced phase change per unit meter can be approximated as:

$$\phi_{heating}(z)=c_{heating}(\alpha_s P_f(z)+\alpha_s P_b(z)+\alpha_p P_p(z))$$

The coefficient $c_{heating}$ can be calculated by solving the heat equation. It depends on the geometry and thermal conductivity of the fiber and its surrounding and on the transverse structure of the guided mode inside the fiber. Obviously, $\phi_{heating}$ has the same structure as $\phi_{nonlinear}$ from the previous equation (in both cases, we ignored a small dependence of $\gamma$ and $c_{heating}$ on the wavelength to have a simple notation). FIG.

Figure 5:
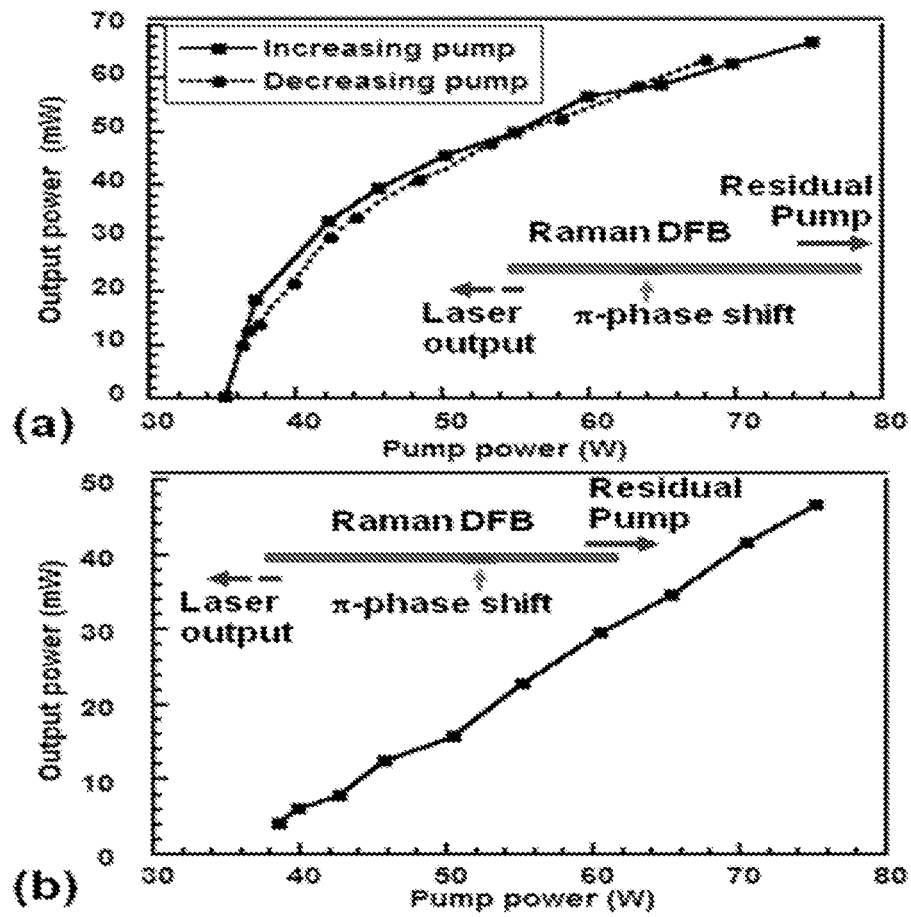
FIG. 5 illustrates backward signal power versus pump power in accordance with an aspect of the present invention.

27 shows $\phi_{heating}$ and $\phi_{nonlinear}$ for the device of FIGS. 16-18, again for a pump power of 70 W (but with a slightly increased strength |q|=69/m, similar to the measured grating from FIG. 5). Obviously, already for the low assumed losses of only 0.01 dB/m, the $\phi_{heating}$ (dashed line) is dominant over $\phi_{nonlinear}$ (solid line). Both have the same shape, because in the region near the pi-phase shift where the intensity is large (see FIG. 16), the forward and backward Stokes intensities are approximately identical and dominant over the pump intensity.

The necessary pre-chirp, expressed in terms of Bragg wavelength and grating phase, respectively, is $$\Delta\lambda_{Bragg,heating} = \lambda_{Bragg,heating}(z) - \lambda_{Bragg} = -\phi_{heating}(z)\frac{\lambda_{Bragg}^2}{2\pi n}$$

and $$\phi_{grating,heating}(z) = -2\int_0^z \phi_{heating}(z')dz'$$

Figure 27:
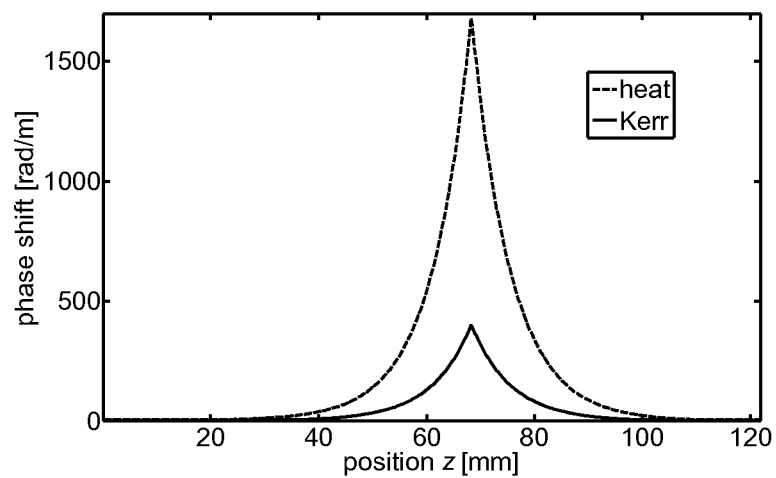
FIG. 27 illustrates nonlinear phase shift per unit meter due to Kerr effect and absorption-induced local heating of a Raman DFB laser in accordance with an embodiment of the present invention.
Figure 28:
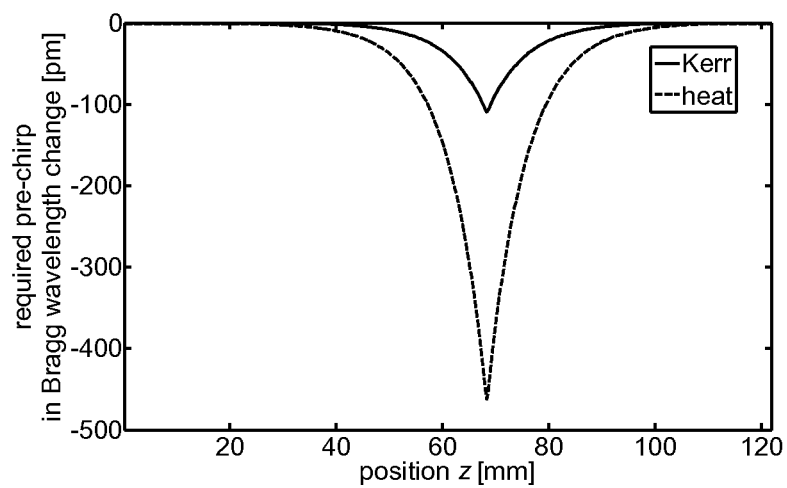
FIG. 28 illustrates the pre-chirp in Bragg wavelength that is required to compensate the nonlinear phase shift from Kerr effect and absorption-induced local heating shown in FIG. 27.

For the case of FIG. 27, this pre-chirp is shown in FIG. 28.

In one embodiment, the grating (i.e., the spatially dependent complex-valued mode-coupling function) is pre-chirped with this phase to compensate for the nonlinear phase change.

In another embodiment of the present invention, a numerical algorithm is employed to find the grating that maximizes the output power for a fixed input pump power. Some possible examples are the known sub-gradient, cutting plane, proximal point or bundle methods, with suitable penalty functions to bound the grating strength, or a simple trial-and-error approach, applied to the nonlinear coupled-mode equations. Thereby, all relevant effects (e.g., Kerr effect, Raman effect, pump depletion, linear loss, nonlinear loss (two-photon absorption)) can be included.

Figure 20:
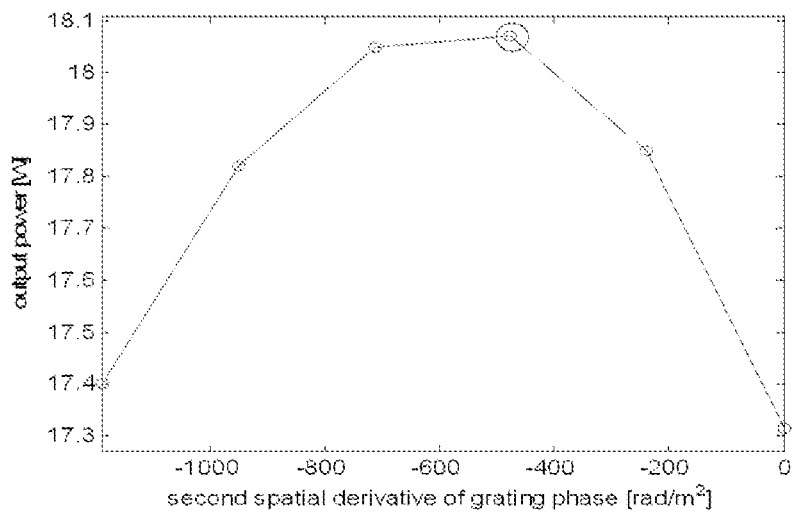
FIG. 20 illustrates the influence of a pre-chirp on output power of a Raman DFB laser, in accordance with an aspect of the present invention.

As an example, FIG. 19 shows the phase of a grating of a length of 124 mm that has been optimized for a maximum output power under the constraints of 70 Watt input power, a discontinuous pi-shift at 71.92 mm (58% length), linear losses of 1 dB/m, negligible nonlinear loss and infinite thermal conductivity. As can be seen in FIG. 20, this pre-chirp (black encircled data point) leads to significantly higher output power than a non-pre-chirped uniform grating (rightmost data point). An algorithm of this type can be used to obtain maximum output power subject to constraints such as fixed pump power and maximum grating index change. Although FIG. 20 shows a relatively simple optimization procedure, in general, any suitable numerical or analytical method, applied to a multi-parameter space of a number of parameters defining the grating, could be performed to obtain maximum output power.

Among other inventive aspects of our approach is the inclusion of high UV (or other actinic) induced linear loss and/or loss due to two photon absorption in the nonlinear coupled mode equations, thermal conductivity profile of the fiber as a function of position along a thermal bath to which the fiber is coupled, figure of merit for both Kerr and TPA vs the Raman gain, the effective area of the fiber, and Ge concentration. Past simulations of Raman fiber DFBs did not include such effects.

The standard definition of the (dimensionless) nonlinear figure of merit is FOM=$n_2/(\beta\lambda)$, where $n_2$ is the nonlinear refractive index, $\beta$ is the TPA coefficient and $\lambda$ is the wavelength. The inventive grating designs described herein can mitigate the effect of the nonlinearity on the local Bragg condition.

To reduce the threshold pump power, a fiber with the following properties is required: low loss (before and after the inscription of the grating, i.e., especially, low UV-induced loss), small effective area, and high Raman gain coefficient. To reduce the influence of the Kerr nonlinearity, the fractional contribution $f_R$ of the delayed Raman response to the nonlinear polarization should be as large as possible. On the other hand, to enable pulsed operation and optical switching, it is be beneficial to use one that has relatively small $f_R$.

One approach to reducing loss in the cavity is to prevent the phase shifted region from being exposed to the actinic (UV, IR femtosecond, etc) beam, or at least to minimize exposure in this region. Thus, a DFB grating could be fabricated with (or without) a phase shift and an unexposed (or lightly exposed) region at the phase shift. If desired, this unexposed (or lightly exposed) region could be increased in length to increase gain. At some length, the laser would no longer be single moded, thus the length should remain below this cutoff to ensure minimal linewidth. Precise calibration of the UV exposure could ensure that the unexposed region would constitute the phase shift, since the small change in effective index in this region would result in an effective phase shift. This phase shift is simply proportional to the integral of the index difference over the non exposed (or lightly exposed) region.

Alternatively, this region could be designed to have a net zero phase shift, and the phase shift could then be determined by the placement of the grating fringes. Such a non-exposed region would be best fabricated with a very narrow writing beam. As an example, a 15 micron beam dimension along the fiber would allow for precise control over the phase shift arising from the non-exposed region.

Other aspects for decreasing the UV induced loss would include replacing part, or all, of the fiber grating with other reflectors such as metal or dielectric films. Alternate embodiments include reducing UV (or other actinic) loss by inscribing the grating with a minimal level of UV or other actinic radiation. Thus, for direct write inscription, a very efficient modulation of the beam would be best. Such a beam would have minimal DC average background exposure in the fiber. Any other means of reducing UV induced loss that is known could also be used. This might include changing the writing wavelength to an optimal wavelength. Finally, UV induced loss could be decreased by decreasing the dopant levels in the core and by using higher purity glass.

Reduction of loss would also decrease the two photon absorption (TPA) associated with the Stokes field. In general, to reduce TPA, a material with a high TPA figure of merit is required. Thus, the best materials for Raman fiber lasers would have both a high TPA figure of merit and a high Raman fraction $f_R$.

In another embodiment, a cavity in accordance with an embodiment of the invention is designed to operate at two wavelengths separated by the Brillouin shift. Raman pumping could then cause both operating wavelengths to lase. However, once lasing, stimulated Brillouin scattering (SBS) would transfer energy to the higher wavelength, thus increasing the power of this mode. In another embodiment, fiber having a high SBS threshold is used The present invention contemplates other embodiments to provide improved Raman DFB lasers.

Figure 21:
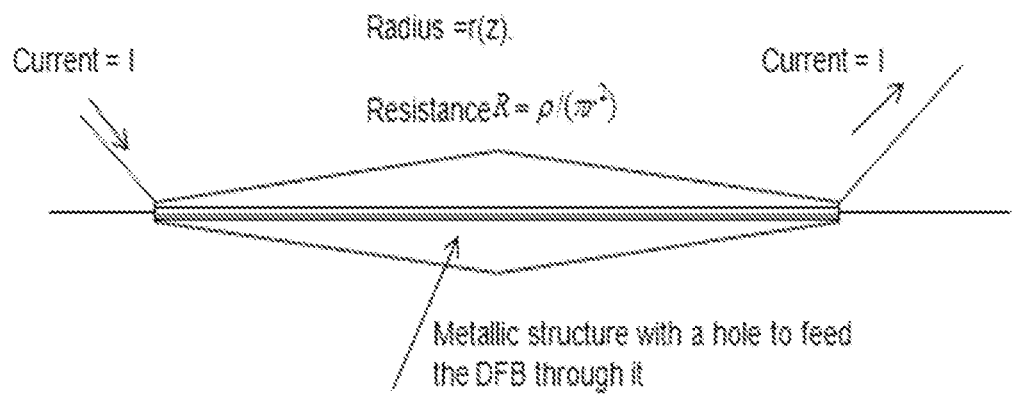
FIG. 21 illustrates a schematic diagram showing a first way to control the temperature distribution along the length of the Raman DFB laser in accordance with an aspect of the present invention.

The required pre-chirp in a DFB grating to null out the nonlinear phase shift can be provided by placing the grating inside a resistive metallic structure with radius varying along the length following a pre-determined function r(z), and flowing current through it. The resistance per-unit length will be $R=\rho/(\pi r^2)$ where $\rho$ is the resistivity in units ohm/meter. The resistive heating and temperature will be proportional to $I^2*R$ (z). An exemplary schematic diagram is shown in FIG. 21. One can gradually change the current from zero to some suitable value to maximize the output.

As discussed previously, a temperature control element is provided to control a temperature excursion along at least a part of a length of the Bragg grating wherein the intensity of the optical field and an associated index change due to Kerr effect or absorption-induced refractive index change is large in relation to different part of the Bragg grating, and with a location of a largest temperature excursion coincident with a location of the phase-shift. The temperature control element can be the heater as mentioned above or a cooling device such as a Peltier element as described later.

The purpose of applying wavelength or temperature or strain excursions along the DFB grating is to compensate for Kerr-effect induced or absorption-induced refractive index changes. The compensation should cover the locations along the grating where the intensity of the optical field and the associated refractive index changes due to Kerr effect or absorption-induced heating are largest. Preferably, one generates a negative (or compensating) Bragg wavelength excursion that is proportional or approximately proportional to intra-cavity optical power. Intra-cavity optical power depends on input power.

Accordingly, in one embodiment, a Bragg wavelength excursion is provided having a location of largest negative Bragg wavelength excursion that is coincident with the location of the phase-shifting element. The amount associated with this negative excursion may be approximately proportional to intra-cavity or input optical power. In various embodiments of the present invention, the term "approximately" means within one of a 10%, 25% or 45% margin. In a further embodiment of the present invention, the Bragg wavelength excursion can be arbitrarily controlled depending on the operating condition, i.e. at different pump power. Further embodiments of the present invention may utilize temperature or strain rather than wavelength.

Although these above-mentioned means are described in connection to Raman DFB lasers, other types of DFB lasers operating at high powers, such as rare-earth or Brillouin, also may benefit by incorporating such means.

In various embodiments of the present invention, the terms "coincides" and "coincident" means an overlap such that the largest or highest excursion takes place anywhere in a region that is defined as being part of the phase shift.

Figure 22:
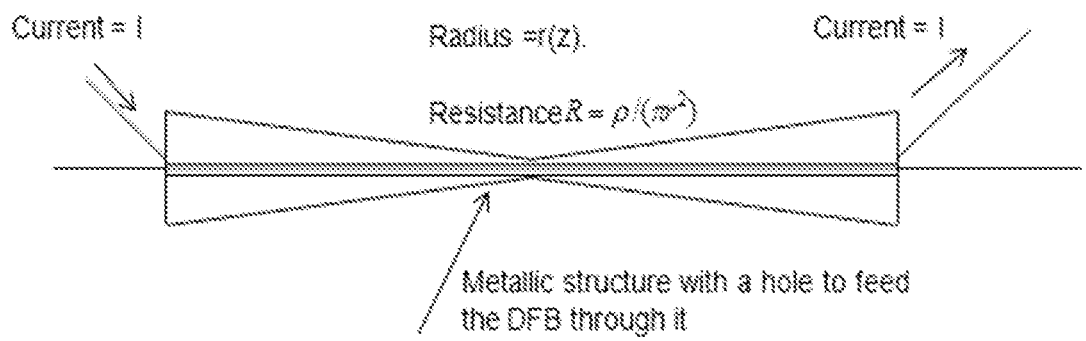
FIG. 22 illustrates a schematic diagram showing a second way to control the temperature distribution along the length of the Raman DFB laser in accordance with an aspect of the present invention.

DFB structures, which will be designed to have pre-chirp (at room temperature) to null out the effect of nonlinear phase shift, may have problem with lasing enough required to reach a desired steady state intensity distribution. A structure as shown in FIG. 22 can be used to apply temperature distribution to a Raman DFB laser to cancel the pre-chirp. One can gradually change the current en to zero or some suitable value to maximize the output.

Whereas FIG. 21 is useful to increase the Bragg wavelength at the center of the Raman fiber compared with that at the edges, the opposite will happen for the structure shown in FIG. 22.

Similar to applying distributed heating along the length of the grating, one can use distributed cooling, for example, using multiple Peltier coolers or bringing the DFB close in proximity to a cooled surface, for example, a metallic surface, that is curved such that the distance between the fiber and the surface varies along the length. By appropriately curving the surface, the desired temperature distribution can be achieved. The curvature of the curved surface can be bent to adjust the temperature distribution profile.

As seen in FIGS. 16 and 17, the intra-cavity field, and, thus, the nonlinear effect decay very strongly as a function of longitudinal position. The intra-cavity field is above 10% of its maximum value, in a region that is about 25% of the cavity length. Thus, by controlling the temperature of the DFB grating in a region about quarter of the length of the cavity, or more, should be helpful in producing larger output.

In the structures shown in FIGS. 21 and 22, the DFB grating can be either coated, for example, with a conducting material or uncoated. As shown, a current I can be applied to the metallic structure to assist in creating a temperature gradient. A second current I2 (not shown) can be applied to the conductive coating, which helps increase the temperature of the entire grating. By controlling I and I2, one will have the flexibility to increase the temperature of the whole grating as well as applying temperature gradient. A conductive capillary or other type of encasement can be used, with the fiber placed inside the capillary. Moreover, a more general set of individual heaters could be applied to obtain a larger variety of temperature profiles.

The grating could also be subjected to bends, either along the entire length or on a shorter length scale using microbend clamps. In this way a profile could be imposed on the grating. Such a profile could make lasing more likely to occur.

In general, the fiber would be sensitive to external perturbations. Even changes of a few degrees C. along the cavity could have a significant effect on the lasing output power. Thus, the fiber must be coupled strongly to a thermal reservoir to allow for heat dissipation.

In accordance with an aspect of the present invention, a Raman fiber laser has an $f_R>0.18$ or in accordance with a further aspect of the present invention an $f_R>0.15$, Also, it can have a two photon FOM>1.

A method of turning on a fiber DFB laser is also provided in accordance with an aspect of the present invention. The steps include (1) applying a startup perturbation to the grating profile through temperature, strain or other means; (2) turning on the pump to a prescribed startup power level for a prescribed startup period of time; and (3) changing the applied grating profile perturbation and pump power to that appropriate for steady state laser operation.

While there have been shown, described and pointed out fundamental novel features of the invention as applied to preferred embodiments thereof it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A Raman laser, comprising:
an optical input enabled to receive radiation from a pump source; and
a Raman gain fiber less than 20 cm in length, comprising at least one Bragg grating enabled to provide Raman radiation on an optical output, wherein the at least one Bragg grating has a phase shift, wherein the at least one Bragg grating is chirped to cause a Bragg wavelength excursion along at least apart of a length of the at least one Bragg grating, wherein an intensity of the an associated optical field is large in relation to a different part of the length of the at least one Bragg grating, wherein a location of a largest negative Bragg wavelength excursion is coincident with a location of the phase-shift of the at least one Bragg grating.

2. The Raman laser of claim 1, wherein the at least one Bragg grating has a longitudinally nonuniform profile in refractive index modulation in strength.

3. The Raman laser of claim 1, wherein the at least one Bragg grating has a longitudinally nonuniform profile in phase.

4. The Raman laser of claim 1, wherein the Raman laser generates Raman radiation on the optical output with an optical spectrum having an optical bandwidth at half maximum optical intensity of about or less than 1 gigahertz (GHz).

5. The Raman laser of claim 4, wherein the optical bandwidth is about or less than 100 MHz.

6. The Raman laser of claim 4, wherein the optical bandwidth is between about 6 MHz and 10 MHz.

7. The Raman laser of claim 1, wherein the Raman laser has a threshold power within a range of 0.08-10 W.

8. The Raman laser of claim 1, wherein the Raman laser has a threshold power within a range of 1.28-4.4 W.

9. The Raman laser of claim 1, further comprising at least one external Raman gain fiber, wherein the external gain fiber utilizes unabsorbed pump radiation to amplify the Raman radiation output.

10. The Raman laser of claim 9, further comprising an isolation element between the at least one Bragg grating and the at least one Raman gain fiber.

11. The Raman laser of claim 1, wherein the Raman laser is placed within a laser resonator and input radiation is generated by a resonant field of the laser resonator.

12. The Raman laser of claim 1, further comprising at least one additional instance of the Raman laser as claimed in claim 1 which is placed in series with the Raman laser of claim 1.

13. The Raman laser of claim 12, wherein the pump source is common to the Raman lasers placed in series.

14. A Raman laser, comprising:
   an optical input enabled to receive radiation from a pump source; and
   a Raman gain fiber less than 20 cm in length, comprising at least one Bragg grating enabled to provide Raman radiation on an optical output, wherein the at least one Bragg grating has a phase shift; and
   a control element selected from the group consisting of:
      a temperature control element to control a temperature excursion along at least a part of a length of the Bragg grating wherein an intensity of an associated optical field is large in relation to a different part of the length of the Bragg grating, wherein a location of a largest temperature excursion is coincident with a location of the phase-shift; and
      a strain control element to control a strain excursion along at least a part of a length of the Bragg grating wherein an intensity of changes to an associated optical field is large in relation to a different part of the length of the Bragg grating, wherein a location of a largest strain excursion is coincident with a location of the phase-shift.

15. The Raman laser of claim 14, wherein the at least one Bragg grating has a longitudinally nonuniform profile in refractive index modulation in strength.

16. The Raman laser of claim 14, wherein the at least one Bragg grating has a longitudinally nonuniform profile in phase.

17. The Raman laser of claim 14, wherein the Raman laser generates Raman radiation on the optical output with an optical spectrum having an optical bandwidth at half maximum optical intensity of about or less than 1 gigahertz (GHz).

18. The Raman laser of claim 17, wherein the optical bandwidth is about or less than 100 MHz.

19. The Raman laser of claim 17, wherein the optical bandwidth is between about 6 MHz and 110 MHz.

20. The Raman laser of claim 14, wherein the Raman laser has a threshold power within a range of 0.08-10 W.

21. The Raman laser of claim 14, wherein the Raman laser has a threshold power within a range of 0.28-4.4 W.

22. The Raman laser of claim 14, wherein the Raman laser is placed within a laser resonator and input radiation is generated by a resonant field of the laser resonator.

\* \* \* \* \*